(12) United States Patent
Nilsson et al.

(10) Patent No.: US 10,920,632 B2
(45) Date of Patent: Feb. 16, 2021

(54) METHOD AND EXHAUST TREATMENT SYSTEM FOR TREATMENT OF AN EXHAUST GAS STREAM

(71) Applicant: Scania CV AB, Södertälje (SE)

(72) Inventors: Magnus Nilsson, Årsta (SE); Henrik Birgersson, Stockhom (SE)

(73) Assignee: Scania CV AB, Södertälje (SE)

( * ) Notice: Subject to any disclaimer, the term of this patent is extended or adjusted under 35 U.S.C. 154(b) by 140 days.

(21) Appl. No.: 15/750,161

(22) PCT Filed: Aug. 25, 2016

(86) PCT No.: PCT/SE2016/050799
§ 371 (c)(1),
(2) Date: Feb. 2, 2018

(87) PCT Pub. No.: WO2017/034467
PCT Pub. Date: Mar. 2, 2017

(65) Prior Publication Data
US 2018/0230875 A1    Aug. 16, 2018

(30) Foreign Application Priority Data
Aug. 27, 2015   (SE) ..................... 1551108

(51) Int. Cl.
*F01N 3/035* (2006.01)
*F01N 9/00* (2006.01)
(Continued)

(52) U.S. Cl.
CPC ........... *F01N 3/035* (2013.01); *F01N 3/0231* (2013.01); *F01N 3/106* (2013.01); *F01N 3/208* (2013.01);
(Continued)

(58) Field of Classification Search
CPC .............. F01N 13/009; F01N 13/0093; F01N 2430/08; F01N 2610/02; F01N 2900/1402;
(Continued)

(56) References Cited

U.S. PATENT DOCUMENTS

| 5,120,695 A | 6/1992 | Blumrich et al. |
| 5,239,860 A | 8/1993 | Harris et al. |

(Continued)

FOREIGN PATENT DOCUMENTS

| CN | 101725392 A | 6/2010 |
| CN | 101932803 A | 12/2010 |

(Continued)

OTHER PUBLICATIONS

Translation of KR 10-2013-0057843 to Park Jie Won (Park). (Year: 2013).*

(Continued)

*Primary Examiner* — Anthony Ayala Delgado
(74) *Attorney, Agent, or Firm* — Moore & Van Allen PLLC; W. Kevin Ransom

(57) ABSTRACT

A method and an exhaust treatment system are provided for treatment of an exhaust stream comprising nitrogen oxides. The method comprises a first oxidation of compounds comprising one or more of nitrogen, carbon and hydrogen in the exhaust stream; a determination of a value for a ratio between a first amount of nitrogen dioxide and a first amount of nitrogen oxides after the first oxidation; and a first supply of a first additive into the exhaust stream, which is actively controlled based on the determined value for the ratio. Subsequently, a first reduction of at least the first amount of nitrogen oxides is carried out through a catalytic reaction in a catalytic filter, which consists of a particulate filter with an at least partly catalytic coating with reduction characteris- (Continued)

tics, and is arranged to catch and oxidize soot particles, and to carry out the first reduction of the first amount of nitrogen oxides.

41 Claims, 5 Drawing Sheets

(51) Int. Cl.
F01N 3/10 (2006.01)
F01N 3/20 (2006.01)
F01N 13/00 (2010.01)
F01N 3/023 (2006.01)

(52) U.S. Cl.
CPC ............ *F01N 3/2066* (2013.01); *F01N 9/00* (2013.01); *F01N 13/009* (2014.06); *F01N 13/0093* (2014.06); *F01N 2430/08* (2013.01); *F01N 2610/02* (2013.01); *F01N 2900/1402* (2013.01); *Y02A 50/20* (2018.01); *Y02T 10/12* (2013.01); *Y02T 10/40* (2013.01)

(58) Field of Classification Search
CPC ........ F01N 3/0231; F01N 3/035; F01N 3/106; F01N 3/2066; F01N 3/208; F01N 9/00
See application file for complete search history.

(56) References Cited

U.S. PATENT DOCUMENTS

| | | | |
|---|---|---|---|
| 6,182,444 B1 | 2/2001 | Fulton et al. | |
| 8,544,260 B2 | 10/2013 | Boorse et al. | |
| 8,656,703 B2 | 2/2014 | Nakamura et al. | |
| 8,679,434 B1 | 3/2014 | Li et al. | |
| 8,899,024 B2 | 12/2014 | Masaki et al. | |
| 9,551,261 B2 | 1/2017 | Matsuo et al. | |
| 9,670,855 B2 | 6/2017 | Dickson et al. | |
| 2004/0040289 A1 | 3/2004 | Mazur et al. | |
| 2004/0098979 A1 | 5/2004 | Hammerle et al. | |
| 2005/0069476 A1 | 3/2005 | Blakeman et al. | |
| 2005/0232830 A1 | 10/2005 | Bruck | |
| 2006/0010857 A1 | 1/2006 | Hu et al. | |
| 2006/0039843 A1 | 2/2006 | Patchett et al. | |
| 2007/0122317 A1 | 5/2007 | Driscoll et al. | |
| 2007/0150154 A1 | 6/2007 | Lenz | |
| 2008/0060348 A1 | 3/2008 | Robel et al. | |
| 2008/0087008 A1 | 4/2008 | Reba et al. | |
| 2009/0031702 A1 | 2/2009 | Robel | |
| 2009/0035194 A1 | 2/2009 | Robel et al. | |
| 2009/0035195 A1 | 2/2009 | Robel | |
| 2009/0193794 A1* | 8/2009 | Robel ............... | F02M 26/15 60/295 |
| 2010/0024393 A1 | 2/2010 | Chi et al. | |
| 2010/0175372 A1 | 7/2010 | Lambert et al. | |
| 2010/0180580 A1 | 7/2010 | Boorse et al. | |
| 2010/0199634 A1 | 8/2010 | Heaton | |
| 2010/0252737 A1 | 10/2010 | Fournel et al. | |
| 2010/0319320 A1 | 12/2010 | Mital et al. | |
| 2011/0113761 A1 | 5/2011 | Boorse et al. | |
| 2011/0162347 A1 | 7/2011 | Katare et al. | |
| 2011/0192147 A1* | 8/2011 | Hoskin ............... | F01N 3/208 60/286 |
| 2011/0211193 A1 | 9/2011 | Saveliev et al. | |
| 2011/0271664 A1 | 11/2011 | Boorse et al. | |
| 2011/0295484 A1 | 12/2011 | L'Henoret | |
| 2011/0313635 A1 | 12/2011 | Blanc et al. | |
| 2012/0060471 A1 | 3/2012 | Gonze et al. | |
| 2012/0117954 A1 | 5/2012 | Yasui et al. | |
| 2012/0255286 A1 | 10/2012 | Matsunaga et al. | |
| 2013/0078173 A1 | 3/2013 | Cox | |
| 2013/0116881 A1 | 5/2013 | Bogema et al. | |
| 2013/0232958 A1* | 9/2013 | Ancimer ............. | F01N 3/208 60/301 |
| 2013/0289857 A1 | 10/2013 | Schmitt et al. | |
| 2014/0052353 A1 | 2/2014 | Sujan et al. | |
| 2014/0056789 A1 | 2/2014 | Mussmann et al. | |
| 2014/0229010 A1 | 8/2014 | Farquharson et al. | |
| 2015/0020506 A1 | 1/2015 | Johansen | |
| 2015/0023853 A1 | 1/2015 | Wittrock et al. | |
| 2015/0033715 A1 | 2/2015 | Markatou et al. | |
| 2015/0131093 A1 | 5/2015 | Saptari | |
| 2015/0143798 A1 | 5/2015 | Lee | |
| 2015/0204226 A1 | 7/2015 | Moore | |
| 2015/0231564 A1 | 8/2015 | Wittrock et al. | |
| 2015/0231565 A1 | 8/2015 | Wittrock et al. | |
| 2015/0337702 A1 | 11/2015 | Ettireddy et al. | |
| 2016/0201533 A1 | 7/2016 | Upadhyay et al. | |
| 2017/0051654 A1 | 2/2017 | Gupta et al. | |

FOREIGN PATENT DOCUMENTS

| | | |
|---|---|---|
| CN | 104847459 A | 8/2015 |
| DE | 3733501 A1 | 4/1989 |
| DE | 102006031650 A1 | 1/2008 |
| DE | 102008026191 A1 | 1/2009 |
| DE | 102009049521 A1 | 7/2010 |
| DE | 102009038835 A1 | 3/2011 |
| DE | 102010050312 A1 | 5/2012 |
| DE | 102012201809 A1 | 9/2012 |
| DE | 102014019427 A1 | 8/2015 |
| DE | 102015015260 A1 | 6/2017 |
| EP | 1181531 A1 | 2/2002 |
| EP | 2390480 A1 | 11/2011 |
| EP | 2907564 A1 | 8/2015 |
| FR | 2956039 A1 | 8/2011 |
| GB | 2352651 A | 2/2001 |
| JP | 2010185369 A | 8/2010 |
| JP | 2011186946 A | 9/2011 |
| JP | 2011196311 A | 10/2011 |
| JP | 2011224455 A | 11/2011 |
| JP | 2012031787 A | 2/2012 |
| JP | 2012036860 A | 2/2012 |
| JP | 2012052510 A | 3/2012 |
| JP | 2012087628 A | 5/2012 |
| JP | 2013002283 A | 1/2013 |
| JP | 2013104346 A | 5/2013 |
| JP | 2014500145 A | 1/2014 |
| JP | 2015040494 A | 3/2015 |
| JP | 2015101968 A | 6/2015 |
| KR | 20090077912 A | 7/2009 |
| KR | 20130057843 A * | 6/2013 |
| KR | 20140143145 | 12/2014 |
| RU | 2547350 C1 | 4/2015 |
| WO | 2006008625 A1 | 1/2006 |
| WO | 2007104382 A1 | 9/2007 |
| WO | 2007145548 A1 | 12/2007 |
| WO | 2008135805 A1 | 11/2008 |
| WO | 2009017597 A1 | 2/2009 |
| WO | 2009017639 A1 | 2/2009 |
| WO | 2010125659 A1 | 11/2010 |
| WO | 2011102781 A1 | 8/2011 |
| WO | 2011118525 A1 | 9/2011 |
| WO | 2011133092 A1 | 10/2011 |
| WO | 2012037342 A1 | 3/2012 |
| WO | 2013022516 A1 | 2/2013 |
| WO | 2013095214 A1 | 6/2013 |
| WO | 2013100846 A1 | 7/2013 |
| WO | 2014014399 A1 | 1/2014 |
| WO | 2014016616 A1 | 1/2014 |
| WO | 2014044318 A1 | 3/2014 |
| WO | 2014060987 A1 | 4/2014 |
| WO | 2014149297 A1 | 9/2014 |

OTHER PUBLICATIONS

Scania CV AB, Chinese Application No. 201680047600.0, First Office Action, dated Sep. 3, 2019.
European Office Action Patent Application No. PCT/SE2016050799 dated Jan. 4, 2019.
Supplementary European Office Action Patent Application No. PCT/SE2016050799 dated Dec. 13, 2018.

(56) References Cited

OTHER PUBLICATIONS

Russian Official Action for Russian Patent Application 2018109517/06(014670) dated Nov. 22, 2018.
Scania CV AB, Korean Application No. 10-2018-7007506, Office Action, dated May 27, 2019.
Scania CV AB, Japanese Application No. 2018-510414, Office Action, dated Apr. 2, 2019.
Scania CV AB, International Application No. PCT/SE2016/050799, International Preliminary Report on Patentability, dated Feb. 27, 2018.
Botar-Jid, Claudiu Cristian (2007)—Selective catalytic reduction of nitrogen oxides with ammonia in forced unsteady state reactors—Case based reasoning and mathematical model simulation reasoning; Retrieved online from http://um.fi/URN:ISBN:978-952-214-469-0; p. 3, second paragraph.
NOx Controls; EPA/452/B-02-001 Section 4—Retrieved online on Jun. 5, 2015 from http://www.epa.gov/ttncatcl/dirl/cs4-2ch2.pdf; pp. 2-6, third paragraph.
International Search Report for PCT/SE2016/050799 dated Nov. 8, 2016.
Written Opinion of the International Searching Authority for PCT/SE2016/050799 dated Nov. 8, 2016.
Scania CV AB, Korean Application No. 10-2018-7007506, Decision of Rejection, dated Mar. 10, 2020.
Scania CV AB, European Application No. 16839709.9, Communication pursuant to Article 94(3) EPC, Oct. 15, 2020.

* cited by examiner

METHOD AND EXHAUST TREATMENT SYSTEM FOR TREATMENT OF AN EXHAUST GAS STREAM

CROSS-REFERENCE TO RELATED APPLICATION(S)

This application is a national stage application (filed under 35 § U.S.C. 371) of PCT/SE2016/050799, filed Aug. 25, 2016 of the same title, which, in turn claims priority to Swedish Application No. 1551108-2, filed Aug. 27, 2015 of the same title; the contents of each of which are hereby incorporated by reference.

FIELD OF THE INVENTION

The present invention relates to a method, an exhaust treatment system, and computer program product for treatment of an exhaust stream.

BACKGROUND OF THE INVENTION

The following background description constitutes a description of the background to the present invention, and thus need not necessarily constitute prior art.

In connection with increased government interests concerning pollution and air quality, primarily in urban areas, emission standards and regulations regarding emissions from combustion engines have been drafted in many jurisdictions.

Such emission standards often consist of requirements defining acceptable limits of exhaust emissions from combustion engines in for example vehicles. For example, emission levels of nitrogen oxides $NO_x$, hydrocarbons $C_xH_y$, carbon monoxide CO and particles PM are often regulated by such standards for most types of vehicles. Vehicles equipped with combustion engines typically give rise to such emissions in varying degrees. In this document, the invention will be described mainly for its application in vehicles. However, the invention may be used in substantially all applications where combustion engines are used, for example in vessels such as ships or aeroplanes/helicopters, wherein regulations and/or standards for such applications limit emissions from the combustion engines.

In an effort to comply with these emission standards, the exhausts caused by the combustion of the combustion engine are treated (purified).

A common way of treating exhausts from a combustion engine consists of a so-called catalytic purification process, which is why vehicles equipped with a combustion engine usually comprise at least one catalyst. There are different types of catalysts, where the different respective types may be suitable depending on for example the combustion concept, combustion strategies and/or fuel types which are used in the vehicles, and/or the types of compounds in the exhaust stream to be purified. In relation to at least nitrous gases (nitrogen monoxide, nitrogen dioxide), referred to below as nitrogen oxides $NO_x$, vehicles often comprise a catalyst, wherein an additive is supplied to the exhaust stream resulting from the combustion in the combustion engine, in order to reduce nitrogen oxides $NO_x$, primarily to nitrogen gas and aqueous vapor.

SCR (Selective Catalytic Reduction) catalysts are a commonly used type of catalyst for this type of reduction, primarily for heavy goods vehicles. SCR catalysts usually use ammonia $NH_3$, or a composition from which ammonia may be generated/formed, as an additive to reduce the amount of nitrogen oxides $NO_x$ in the exhausts. The additive is injected into the exhaust stream resulting from the combustion engine upstream of the catalyst. The additive added to the catalyst is adsorbed (stored) in the catalyst, in the form of ammoniac $NH_3$, so that a redox-reaction may occur between nitrogen oxides $NO_x$ in the exhausts and ammonia $NH_3$ available via the additive.

A modern combustion engine is a system where there is cooperation and mutual impact between the engine and the exhaust treatment. Specifically, there is a correlation between the exhaust treatment system's ability to reduce nitrogen oxides $NO_x$ and the fuel efficiency of the combustion engine. For the combustion engine, there is a correlation between the engine's fuel efficiency/total efficiency and the nitrogen oxides $NO_x$ produced by it. This correlation specifies that for a given system there is a positive correlation between nitrogen oxides $NO_x$ produced and fuel efficiency, in other words an engine that is permitted to emit more nitrogen oxides $NO_x$ may be induced to consume less fuel by way of, for example, a more optimal selection of the injection timing, which may yield a higher combustion efficiency. Similarly, there is often a negative correlation between a produced particle mass PM and the fuel efficiency, meaning that an increased emission of particle mass PM from the engine is connected with an increased fuel consumption. This correlation is the background to the widespread use of exhaust treatment systems comprising an SCR-catalyst, where the intention is the optimization of the engine regarding fuel consumption and emission of particles, towards a relatively larger amount of nitrogen oxides $NO_x$ produced. A reduction of these nitrogen oxides $NO_x$ is then carried out in the exhaust treatment system, which thus may comprise an SCR catalyst. Through an integrated approach in the design of the engine and exhaust treatment system, where the engine and exhaust treatment complement each other, a high fuel efficiency may therefore be achieved jointly with low emissions of both particles PM as well as nitrogen oxides $NO_x$.

SUMMARY OF THE INVENTION

To a certain extent, the performance of the exhaust treatment may be improved by increasing the substrate volumes comprised in the exhaust treatment systems. In particular, the losses due to an uneven distribution of the exhaust flow may be reduced. However, larger substrate volumes result in a direct impact on the cost of manufacture and/or production. A larger substrate volume also results in a greater back pressure, which counteracts potential gains in fuel consumption, due to the higher conversion degree caused by the increased volume. It is thus important to be able to use the exhaust treatment system optimally, for example by avoiding over-sizing and/or by limiting the exhaust treatment system's spread in terms of size and/or manufacturing cost.

The function and efficiency for catalysts in general, and for catalysts with reduction characteristics in particular, is dependent, for example, on a ratio between nitrogen dioxide and nitrogen oxides, that is to say the $NO_2/NO_x$-fraction, in the exhausts. The $NO_2/NO_x$-fraction depends, however, on a number of other factors, for example how the driver drives the vehicle and/or on a current driving mode. For example, the $NO_2/NO_x$-fraction in the exhausts may depend on the torque requested by a driver and/or by a cruise control, on the appearance of the road section in which the vehicle is located and/or the driving style of the driver.

A traditional exhaust treatment system generates a substantially constant fraction of nitrogen dioxide $NO_2$ in the nitrogen oxides $NO_x$ for a given exhaust flow and a given temperature. The optimization of these components is difficult, since these parameters will depend on the manner in which the engine is used, and may not be controlled/regulated. Reduction catalysts in the exhaust treatment system need, on the one hand, a sufficiently high fraction of nitrogen dioxide $NO_2$ at low exhaust temperatures. On the other hand, their function deteriorates if the fraction of nitrogen dioxide $NO_2$ becomes too high at an optimal temperature for an oxidation catalyst DOC and for a particulate filter DPF in the exhaust treatment system. Exhaust treatment systems of today may therefore suffer from both too large/too high fractions of nitrogen dioxide $NO_2$, and too small/too low fractions of nitrogen dioxide $NO_2$, depending on the current operation and/or hardware specification for the respective component.

In some conditions regarding the catalyst temperature and flow, i.e. for a certain dwell-time in the catalyst ("Space Velocity"), there is a risk that a non-advantageous fraction of nitrogen dioxides $NO_2$ over nitrogen oxides $NO_x$ is obtained. Specifically, there is a risk that the ratio $NO_2/NO_x$ exceeds the value 50%, which may constitute a real problem for the exhaust purification. An optimization of the ratio $NO_2/NO_x$ for critical operating modes with low temperatures thus risk, with prior art solutions, giving too high a fraction of nitrogen dioxide $NO_2$ in other operating modes at higher temperatures. This higher fraction of nitrogen dioxide $NO_2$ results in a greater volume requirement for the SCR-catalyst, and/or in a limitation of the amount of nitrogen oxides emitted from the engine, and accordingly a poorer fuel efficiency for the vehicle/engine. Additionally, there is a risk that the higher fraction of nitrogen dioxide $NO_2$ also results in production of laughing gas $N_2O$ in a selective catalytic reduction catalyst, potentially arranged downstream.

These risks of a non-advantageous fraction of nitrogen monoxide $NO_2$ arising also exist due to the system's ageing. For example, the ratio $NO_2/NO_x$ may assume lower values when the system has aged, which may entail that a catalyst specification, which results in too high fractions of $NO_2/NO_x$ in a non-aged state, must be used to compensate for ageing.

There are also prior art exhaust treatment systems comprising a catalytic particulate filter SCRF, such as WO2014044318. A catalytic particulate filter is a filter comprising a catalytic coating, with the characteristic that the coating may be used for reduction of nitrogen oxides $NO_x$. However, these prior art exhaust treatment systems often experience problems relating to an insufficient soot oxidation in the catalytic filter SCRF. These problems are due at least partly to the fact that the reactions comprised in the reduction of nitrogen oxides $NO_x$ are faster than the reactions comprised in the soot oxidation. In addition, the reducing system in WO2014044318 is relatively large in terms of volume, which may lead to problems as mentioned above. The second SCR-catalyst in WO2014044318 also becomes relatively inefficient in this configuration.

High fractions of nitrogen dioxide $NO_2$ in the nitrogen oxides $NO_x$ thus entail that the kinetic activities of the SCR-catalyst are limited. Adaptations of the urea dosage, which occur during a relatively brief time period, in this case also run a risk of not giving correct results, because of a reduced catalytic efficiency of the SCR-catalyst.

Overall, this means that it is difficult to find a solution to achieve both an optimized fuel consumption, and an efficient exhaust treatment. This means that it becomes very important to be able to use the system in as optimal a manner as possible, with respect to both fuel consumption and exhaust treatment. There is accordingly a need for an optimization of the function in exhaust treatment systems.

Therefore, one objective of the present invention is to provide a method and a system, which may provide an optimization of the function of today's exhaust treatment systems and thus a high performance, and a good function, under varying conditions.

According to the present invention a method and an exhaust treatment system are provided for treatment of an exhaust stream, which results from a combustion in a combustion engine and comprises nitrogen oxides $NO_x$. Nitrogen oxides $NO_x$ comprise nitrogen monoxide NO and nitrogen dioxide $NO_2$.

A first oxidation of compounds, comprising one or more of nitrogen, carbon and hydrogen, in the exhaust stream is carried out by a first oxidation catalyst arranged in the exhaust treatment system.

A determination of a value $(NO_{2\_1}/NO_{x\_1})_{det}$ is then carried out for a ratio between a first amount of nitrogen dioxide $NO_{2\_1}$ and a first amount of nitrogen oxides $NO_{x\_1}$ leaving the first oxidation catalyst and then reaching a catalytic filter.

A first supply of a first additive into the exhaust stream is carried out with the use of a first dosage device, arranged downstream of the first oxidation catalyst. This first supply is, according to the present invention, actively controlled, based on the determined value $(NO_{2\_1}/NO_{x\_1})_{det}$ for the ratio.

A first reduction of at least the first amount of nitrogen oxides $NO_{x\_1}$ is then carried out with the use of a catalytic reaction in a catalytic filter, arranged downstream of the first dosage device. This catalytic filter consists of a particulate filter with an at least partly catalytic coating with reduction characteristics. The catalytic filter is arranged to catch and oxidize soot particles, and to carry out the first reduction of the first amount of nitrogen oxides $NO_{x\_1}$. The catalytic reaction for the first reduction uses the first additive and the reduction characteristics of the at least partly catalytic coating.

The active control of the first reduction may, according to different embodiments of the present invention, be carried out through an active control of the administration of additive with the first dosage device.

Additionally, according to one embodiment of the present invention, an active control of an exhaust environment may be carried out, comprising, for example, a temperature for the exhaust stream at the catalytic filter. The exhaust environment may here, for example, be oxidizing, with good access to air, or it may be reducing, with poorer access to air. Fuel injection into the engine may thus be controlled to impact the exhaust environment.

The active control of the temperature may, according to different embodiments of the present invention, be controlled by adjusting the air/fuel-ratio (the lambda value) in the combustion engine, wherein a reduced air flow increases the temperature, and an increased air flow reduces the temperature. The air/fuel ratio may, for example, be changed by changing the combustion mode of the engine.

The air flow through, and accordingly also the temperature for, the exhaust treatment system may also be controlled by controlling a gearbox in the vehicle, since the use of different gears results in different air flows through the exhaust treatment system.

The present invention generally provides a control of a ratio $NO_2/NO_x$, between the amount of nitrogen dioxide $NO_2$ and the amount of nitrogen oxides $NO_x$. Thus, for example, excessively high values for this ratio may be avoided through the active control. For example, $NO_2/NO_x > 50\%$ may be avoided, since the value for the ratio may be actively controlled to decrease. The value for the ratio $NO_2/NO_x$ may also be increased when the value is too low, for example if $NO_2/NO_x < 50\%$.

By, according to one embodiment of the present invention, decreasing the supply of the first additive if the fraction of nitrogen dioxide $NO_2$ is too high in an exhaust treatment system, comprising among others a catalytic filter SCRF arranged upstream and a reduction catalyst device arranged downstream, an exhaust treatment system with an overall good performance in relation to both reduction of nitrogen oxides $NO_x$ and soot oxidation in the catalytic filter is obtained.

With the use of one embodiment of the present invention, the fraction of nitrogen oxides $NO_x$ consisting of nitrogen dioxide $NO_2$ may thus be actively controlled, which is facilitated by an active control of the amount of nitrogen oxides $NO_x$ upstream of at least one substrate with oxidizing coating, for example comprising precious metals, in the exhaust treatment system. This control of the ratio $NO_2/NO_x$ may, apart from advantages in catalytic performance, such as higher $NO_x$-conversion, also result in a possibility of specifically reducing emissions of nitrogen dioxide $NO_2$, which result in a very poisonous and strong smelling emission. This may result in advantages at a potential future introduction of a separate legal requirement relating to nitrogen dioxide $NO_2$, through a possibility of reducing emissions of nitrogen dioxide $NO_2$. This may be compared with for example the Euro VI-system, in which the fraction of nitrogen dioxide $NO_2$ provided at exhaust purification may not be directly impacted in the exhaust treatment system itself, since the fraction of nitrogen dioxide $NO_2$ in the Euro VI-system is due to usage/operation, and may not be controlled in any other way.

In other words, the active control of the level of nitrogen dioxide $NO_2$ is facilitated by the use of the present invention, which is used to increase or decrease the level of nitrogen dioxide $NO_2$ in the driving modes for which this is necessary. Thus, an exhaust treatment system may be created, which requires less precious metal and accordingly also is cheaper to manufacture.

Through the use of the control according to the present invention, a fuel consumption neutral manner of increasing the reaction speed over one or several selective catalytic reduction catalysts in the exhaust treatment system is obtained, since the control may be carried out in such a way, that as large a fraction as possible of the reduction occurs via reaction paths over both nitrogen oxide NO and nitrogen dioxide $NO_2$. Thus, through the control according to the invention, the fraction of the total conversion of nitrogen oxides $NO_x$ occurring via a fast reaction path, that is to say via a "fast SCR", wherein the reduction occurs via reaction paths over both nitrogen oxide NO and nitrogen dioxide $NO_2$, may be increased through active control of the level of nitrogen dioxide $NO_2$. Accordingly, the volume requirements relating to the catalyst may also be reduced. Fast SCR is described in further detail below.

The ratio $NO_2/NO_x$ may, due to ageing, assume lower values, for example after the exhaust treatment system has been in operation for some time. There is accordingly a risk that a non-advantageous fraction of nitrogen dioxide $NO_2$ in the nitrogen oxides $NO_x$ may arise, because of ageing/degrading of the exhaust treatment system. For example, the ratio $NO_2/NO_x$ may assume lower values when the exhaust treatment system has aged, which may entail that a catalyst specification which, in a non-aged/new state, results in too high fractions of $NO_2/NO_x$, must be used to make provision for and compensate for future ageing/degradation.

The present invention provides for a possibility of preventing this characteristic, which has deteriorated over time, and is negative for the exhaust treatment system, by preventing excessively low values for the ratio $NO_2/NO_x$ with the active control according to the invention. Since it is possible, when the present invention is used, to handle higher initial values for the ratio $NO_2/NO_x$, there are better conditions for optimizing performance for both new and aged exhaust treatment systems.

The present invention uses the fact that the catalytic activity obtained at a given temperature may be impacted, if the composition of the exhausts deteriorates. By adjusting the fraction of nitrogen oxides $NO_x$ that constitute nitrogen dioxides $NO_2$, an impact of the reactions that are the basis of the reduction may be achieved. In other words, the reduction catalyst's activity may be impacted by an adjustment of the fraction of nitrogen oxides $NO_x$ consisting of nitrogen dioxide $NO_2$. A fraction of the nitrogen oxides $NO_x$, consisting of nitrogen dioxide $NO_2$ representing 50%, results, according to different embodiments of the present invention, in the fastest kinetics and/or the best catalytic performance, and therefore results in the smallest requirements relating to substrate volumes for the catalytic filter. Additionally, a control according to the invention, towards a suitable value for the fraction of the nitrogen oxides $NO_x$ consisting of nitrogen dioxides $NO_2$, means that the requirements regarding a potential slip-catalyst SC, arranged downstream in the exhaust treatment system, are lower.

By actively controlling the level of nitrogen oxides $NO_x$ reaching the one or several substrates with an oxidizing coating in the exhaust treatment system, which may for example be comprised in an oxidation catalyst DOC and/or in a catalytic coating that also has oxidizing characteristics in the catalytic filter SCRF, an adjustment of the fraction of nitrogen dioxide $NO_2$ reaching a catalytic filter and/or a reduction catalyst device may, for example, be carried out when the catalytic filter and/or the reduction catalyst device are arranged downstream of the oxidizing coating. This means, for example, that the reduction catalyst device provides a turnover which is more predictable. This concerns, for example, an active control corresponding to an increase of the amount of nitrogen oxides $NO_x$ produced by the engine, in cases where there is a risk that the nitrogen dioxide $NO_2$ fraction of the nitrogen oxides $NO_x$ may exceed a maximum desired value (an upper threshold value).

By using the present invention, a more efficient and predictable reduction of nitrogen oxides $NO_x$ is obtained. As a result, for example, adaptations of urea dosage give more reliable results.

The active control according to the present invention has potential to facilitate that the exhaust treatment system may fulfil emission requirements in the Euro VI emission standard. Additionally, the control according to the present invention has potential to facilitate that the exhaust treatment system is able to meet the emission requirements in several other existing, and/or future emission standards.

This means that the present invention may provide the required/desired/requested impact, such as, for example, required reduction of nitrogen oxides $NO_x$ in the exhaust stream, under a large number of different conditions. This may thus ensure that a required/desired/requested amount of nitrogen oxides $NO_x$ is emitted from the exhaust treatment system. Accordingly, legal requirements and/or standards for emissions of nitrogen oxides $NO_x$ from the exhaust treatment system may be fulfilled in many more conditions and/or driving modes, than when prior art systems are used.

A required impact/reduction/catalytic function referred to in this document may be related to a maximum permitted emission of nitrogen oxides $NO_x$, which may be based, for example, on emission requirements in the Euro VI emission standard or in other existing and/or future emission standards.

With the use of the present invention, a better fuel optimization may be obtained for the vehicle, since there is thus potential to control the engine in a more fuel efficient manner, so that a higher efficiency for the engine is obtained. Thus, a performance gain and/or a reduced emission of carbon dioxide $CO_2$ may be obtained when the present invention is used.

The present invention also has an advantage in that two cooperating dosage devices are used in combination for the administration of a reductant, for example urea, upstream of the catalytic filter and the reduction device, which relieves and facilitates mixture and potential evaporation of the reductant, since the injection of the reductant is divided between two physically separate positions. This reduces the risk of the reductant cooling down the exhaust treatment system locally, which may potentially form deposits at the positions where the reductant is injected, or downstream of such positions.

BRIEF SUMMARY OF THE DRAWINGS

The invention will be illustrated in more detail below, along with the enclosed drawings, where similar references are used for similar parts, and where.

DETAILED DESCRIPTION OF THE INVENTION

Figure 1:
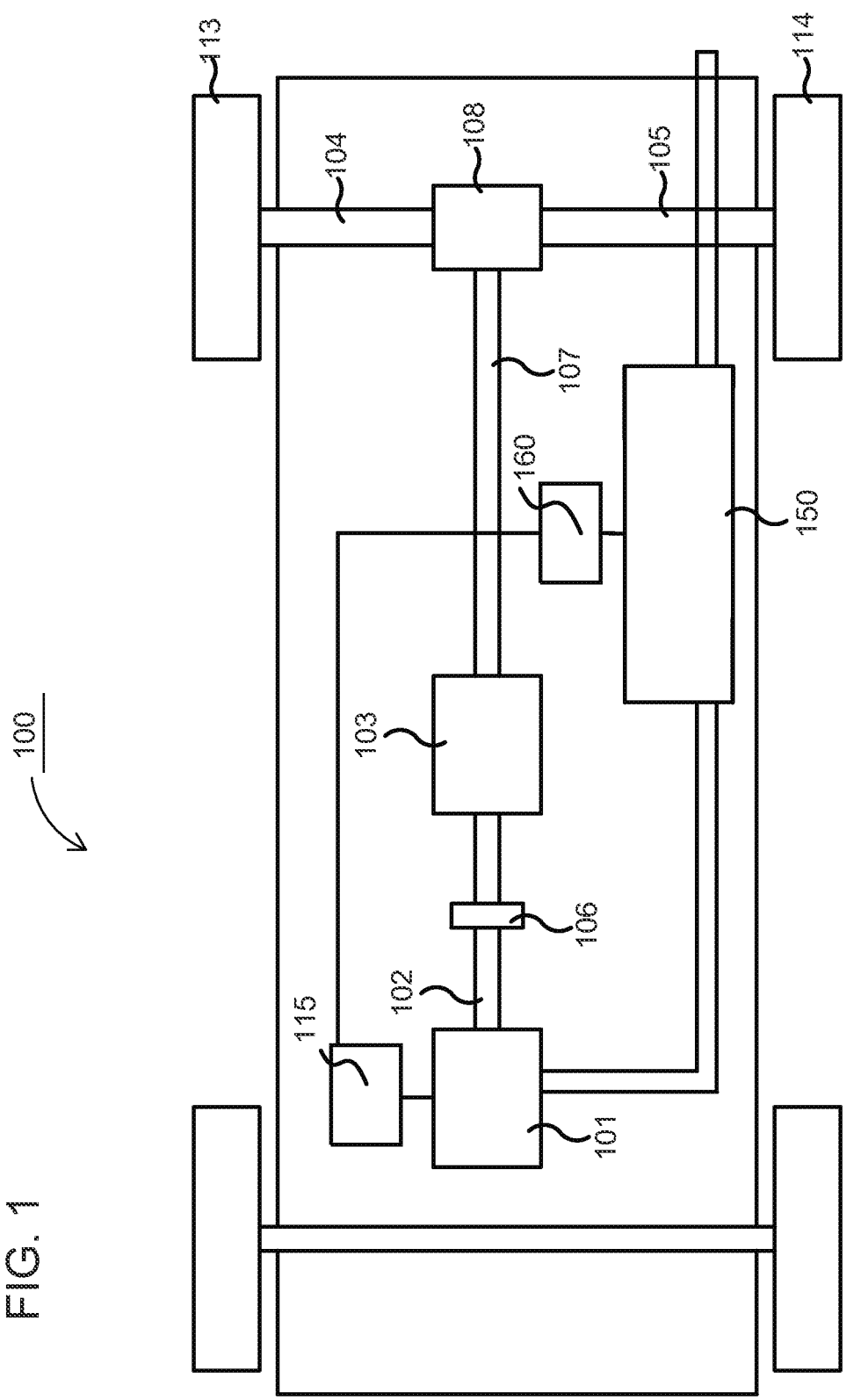
FIG. 1 shows an example vehicle which may comprise the present invention.

FIG. 1 schematically shows an example vehicle 100 comprising an exhaust treatment system 150, which may be an exhaust treatment system 150 according to one embodiment of the present invention. The power-train comprises a combustion engine 101, which in a customary manner, via an output shaft 102 on the combustion engine 101, usually via a flywheel, is connected to a gearbox 103 via a clutch 106.

The combustion engine 101 is controlled by the vehicle's control system via a control device 115. Likewise, the clutch 106 and the gearbox 103 may be controlled by the vehicle's control system, with the help of one or more applicable control devices (not shown). Naturally, the vehicle's power-train may also be of another type, such as a type with a conventional automatic gearbox, of a type with a hybrid power-train, etc.

An output shaft 107 from the gearbox 103 drives the wheels 113, 114 via a final drive 108, such as e.g. a customary differential, and the drive shafts 104, 105 connected to said final drive 108.

The vehicle 100 also comprises an exhaust treatment system/exhaust purification system 150 for treatment/purification of exhaust emissions resulting from combustion in the combustion chambers, which may consist of cylinders, of the combustion engine 101. The exhaust treatment system 150 may be controlled by the vehicle's control system via a control device 160, which may also be connected to the engine, and/or to an engine control device 115.

According to the present invention, a method is provided for the treatment of an exhaust stream, which results from a combustion in a combustion engine and comprises nitrogen oxides $NO_x$. As mentioned above, nitrogen oxides $NO_x$ comprise nitrogen monoxide NO and nitrogen dioxide $NO_2$. This method may be illustrated with the flow chart in FIG. 2.

In a first step 210 of the method, a first oxidation of compounds comprising one or more of nitrogen, carbon and hydrogen in the exhaust stream is carried out by a first oxidation catalyst, arranged in the exhaust treatment system.

In a second step 220 of the method, a determination of a value $(NO_{2\_1}/NO_{x\_1})_{det}$ for a ratio between a first amount of nitrogen dioxide $NO_{2\_1}$ and a first amount of nitrogen oxides $NO_{x\_1}$ leaving the first oxidation catalyst and then reaching a catalytic filter is carried out.

In a third step 230 of the method, a first supply of a first additive into the exhaust stream is carried out with the use of a first dosage device, arranged downstream of the first oxidation catalyst. This first supply is, according to the present invention, actively based on the determined value $(NO_{2\_1}/NO_{x\_1})_{det}$ for the ratio.

In a fourth step 240 of the method, a first reduction of at least the first amount of nitrogen oxides $NO_{x\_1}$ is carried out by way of a catalytic reaction in a catalytic filter, arranged downstream of the first dosage device. This catalytic filter consists of a particulate filter with an at least partly catalytic coating with reduction characteristics, and is often referred to herein as SCRF. The catalytic filter is arranged to catch and oxidize soot particles, and to carry out the first reduction of the first amount of nitrogen oxides $NO_{x\_1}$. The catalytic reaction uses the first additive and the reduction characteristics of the at least partly catalytic coating.

The active control of the first supply 230 of the first additive, according to the present invention, results in an active control of the first reduction 240 of the first amount of nitrogen oxides $NO_{x\_1}$, which reduction is carried out in the catalytic filter.

This first reduction 240 of the first amount of nitrogen oxides $NO_{x\_1}$ may be achieved through the first additive reacting with the first amount of nitrogen oxides $NO_{x\_1}$ at the at least partly catalytic coating in the catalytic filter SCRF.

This first reduction 240 may also be achieved by way of a first amount of nitrogen dioxide $NO_{2\_1}$, which is comprised in the first amount of nitrogen oxides $NO_{x\_1}$, reacting with soot particles at the oxidation of the soot particles in the catalytic filter. The active control of the first supply 230 of the first additive is in this case based at least on an amount of soot in the catalytic filter.

According to one embodiment of the present invention, the method comprises an additional sixth step 260, in which a second supply of a second additive into the exhaust stream 303 is carried out with the use of a second dosage device, arranged downstream of the catalytic filter.

In a seventh step 270 of the method according to the embodiment, a second reduction of a second amount of nitrogen oxides $NO_{x\_2}$, reaching a reduction catalyst device arranged downstream of the second dosage device, is carried out. This second reduction in this case uses the first and/or second additive.

Figure 2:
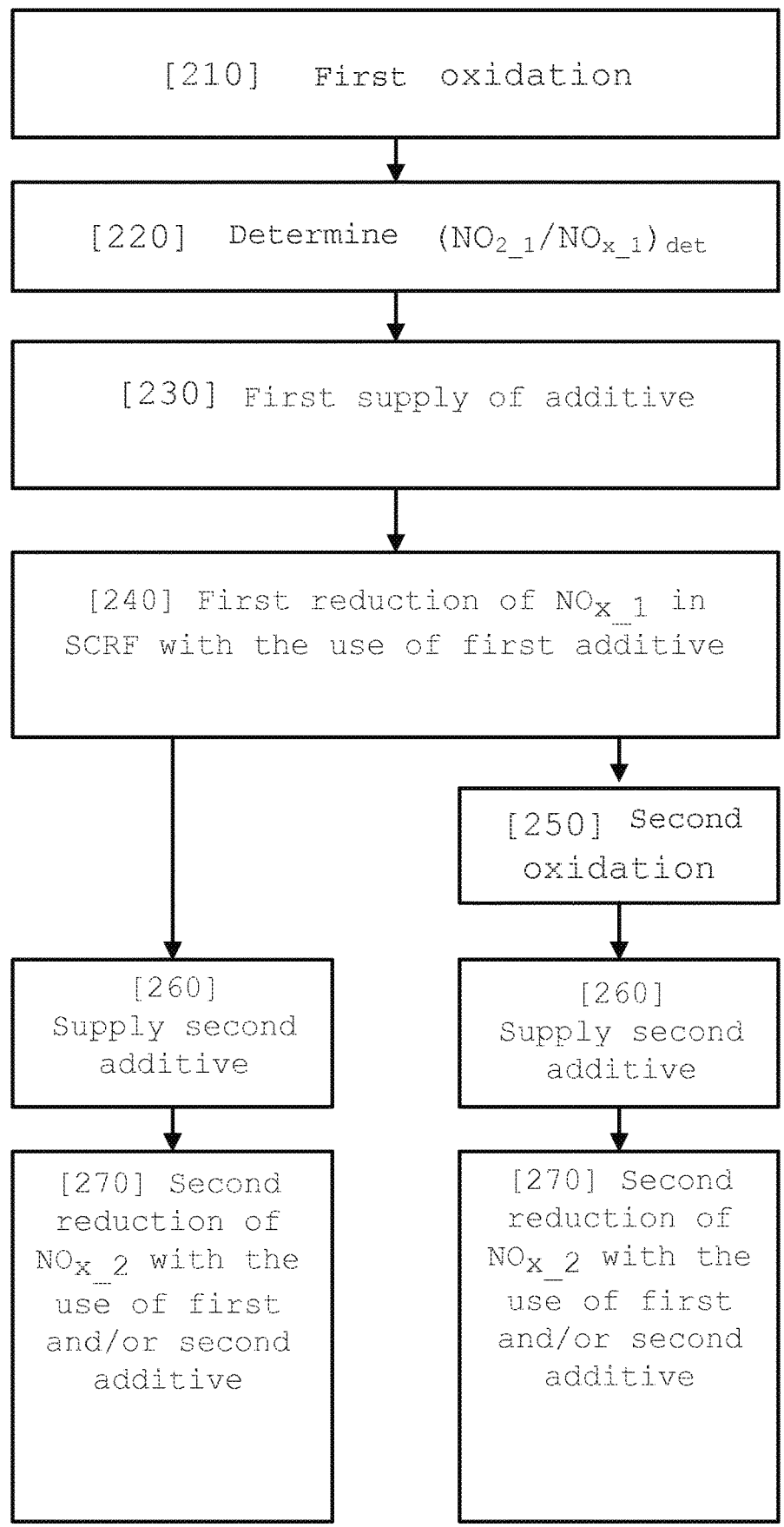
FIG. 2 shows a flow chart for the method for exhaust treatment according to the invention.

For the embodiment of the present invention, which comprises the steps 210, 220, 230, 240, illustrated in FIG. 2 and described above, and in certain embodiments also the steps 260, 270, the active control of the first supply 230 may be carried out in such a manner that it results in a decreased first reduction of the first amount of nitrogen oxides $NO_{x\_1}$, by way of a decreased supply 230 of the first additive. This decreasing may, according to one embodiment, be carried out if the determined value $(NO_{2\_1}/NO_{x\_1})_{det}$ for the ratio is equal to or greater than an upper threshold value $(NO_{2\_1}/NO_{x\_1})_{threshold\_high}$, $(NO_{2\_1}/NO_{x\_1})_{det} \geq (NO_{2\_1}/NO_{x\_1})_{threshold\_high}$. The decrease may, for example, represent an interruption. This upper threshold value $(NO_{2\_1}/NO_{x\_1})_{threshold\_high}$ may, for example, have a value that depends on a representation of a temperature of the catalytic filter SCRF and/or of a reduction catalyst device, arranged downstream of the catalytic filter, and may have a value corresponding to 45%, 50%, 60% or >65%. These representations of one or several temperatures may, for example, be based on measured, modelled and/or predicted temperatures in the exhaust treatment system, using, for example, one or several temperature sensors described herein, which may be arranged in/at/on, upstream and/or downstream of the catalytic filter and/or the reduction catalyst device.

Thus, the first amount of nitrogen oxides $NO_{x\_1}$ corresponds to a first ratio $NO_{2\_1}/NO_{x\_1}$, between a first amount of nitrogen dioxide $NO_{2\_1}$ and a first amount of nitrogen oxides $NO_{x\_1}$, reaching the catalytic filter. The first supply 230 of the first additive may in this case be controlled based on a determined value $(NO_{2\_1}/NO_{x\_1})_{det}$ for the first ratio, so that a fast reduction may be used at the reduction in the catalytic filter and/or in the reduction catalyst device. Thus, the first supply 230 may be controlled in such a way that the reduction in the catalytic filter occurs, to as great an extent as possible, via reaction paths over both nitrogen oxides NO, and nitrogen dioxide $NO_2$.

According to one embodiment of the present invention, the method also comprises a fifth step 250, in which a second oxidation of compounds, comprising one or more of nitrogen, carbon and hydrogen, in the exhaust stream is carried out. The second oxidation 250 may, according to one embodiment, be carried out by a second oxidation catalyst arranged downstream of the catalytic filter. The second oxidation 250 may also, according to another embodiment, be carried out with the use of the at least partly catalytic coating which is comprised in the catalytic filter, wherein the catalytic coating then, apart from its reduction characteristics, also has oxidation characteristics.

In a sixth step 260 of the method according to the embodiment, a second supply of a second additive into the exhaust stream 303 is carried out with the use of a second dosage device, arranged downstream of the catalytic filter.

In a seventh step 270 of the method according to the embodiment, a second reduction of a second amount of nitrogen oxides $NO_{x\_2}$, reaching a reduction catalyst device arranged downstream of the second dosage device, is carried out. This second reduction in this case uses the first and/or second additive.

For the embodiment of the present invention, which comprises the steps 210, 220, 230, 240, 250 illustrated in FIG. 2 and described above, and in some embodiments also the steps 260, 270, the active control of the first supply 230 may be carried out in such a manner that it results in a decreased first reduction of the first amount of nitrogen oxides $NO_x$, by way of a decreased first supply 230 of the first additive. This decrease may, according to one embodiment, be carried out if the determined value $(NO_{2\_1}/NO_{x\_1})_{det}$ for the ratio is equal to or greater than an upper threshold value $(NO_{2\_1}/NO_{x\_1})_{threshold\_high}$, $(NO_{2\_1}/NO_{x\_1})_{det} \geq (NO_{2\_1}/NO_{x\_1})_{threshold\_high}$. This upper threshold value $(NO_{2\_1}/NO_{x\_1})_{threshold\_high}$ may, for example, have a value that depends on a representation of a temperature of the catalytic filter SCRF, and/or of a reduction catalyst device arranged downstream of the catalytic filter, and may have a value corresponding to 45%, 50%, 60% or >65%. These representations of one or several temperatures may, for example, be based on measured, modelled and/or predicted temperatures in the exhaust treatment system, using for example one or several temperature sensors described herein, which may be arranged in/at/on, upstream and/or downstream of the catalytic filter and/or the reduction catalyst device.

For the embodiment of the present invention, which comprises the steps 210, 220, 230, 240, 250, illustrated In FIG. 2 and described above, and in certain embodiments also the steps 260, 270, the active control of the first supply 230 may also be carried out in such a manner that it results in an increased first reduction of the first amount of nitrogen oxides $NO_{x\_1}$ in the catalytic filter. The first reduction is controlled to increase by increasing the first supply 230 of the first additive, if the determined value $(NO_{2\_1}/NO_{x\_1})_{det}$ for the ratio is smaller than or equal to a lower threshold value $(NO_{2\_1}/NO_{x\_1})_{threshold\_low}$, $(NO_{2\_1}/NO_{x\_1})_{det} \leq (NO_{2\_1}/NO_{x\_1})_{threshold\_low}$. The lower threshold value $(NO_{2\_1}/NO_{x\_1})_{threshold\_low}$ may have a value depending on a representation of a temperature in the catalytic filter, and/or the reduction catalyst device arranged downstream of the catalytic filter. For example, the lower threshold value $(NO_{2\_1}/NO_{x\_1})_{threshold\_low}$ may have a value representing 50%, 45%, 30%, 20%, or 10%. These representations of one or several temperatures may, for example, be based on measured, modelled and/or predicted temperatures in the exhaust treatment system, using for example one or several temperature sensors described herein, which may be arranged in/at/on, upstream and/or downstream of the catalytic filter and/or the reduction catalyst device.

Thus, the first amount of nitrogen oxides $NO_{x\_1}$ corresponds to a first ratio $NO_{2\_1}/NO_{x\_1}$, between a first amount of nitrogen dioxide $NO_{2\_1}$ and a first amount of nitrogen oxides $NO_{x\_1}$, reaching the catalytic filter. The first supply 230 of the first additive may in this case be controlled based on a determined value $(NO_{2\_1}/NO_{x\_1})_{det}$ for the first ratio, in such a manner that a fast reduction may be used at the reduction in the catalytic filter, and/or in a reduction catalyst device arranged downstream. Thus, the first supply 230 may be controlled in such a way that the reduction in the catalytic filter occurs, to as great an extent as possible, via reaction paths over both nitrogen oxides NO, and nitrogen dioxide $NO_2$.

According to one embodiment of the present invention, the active control of the first supply 230 is also based on a determined value $(NO_{2\_2}/NO_{x\_2})_{det}$ for a second ratio, between a second amount of nitrogen dioxide $NO_{2\_2}$ and a second amount of nitrogen oxides $NO_{x\_2}$, reaching the reduction catalyst device. The active control of the first supply 230 of the first additive is in this case carried out in such a manner, that an increased first reduction of the first amount of nitrogen oxides $NO_{x\_1}$ is carried out in the catalytic filter, if the determined value $(NO_{2\_2}/NO_{x\_2})_{det}$ for the ratio is less than or equal to a lower threshold value $(NO_{2\_2}/NO_{x\_2})_{threshold\_low}$, $(NO_{2\_2}/NO_{x\_2})_{det} \leq (NO_{2\_2}/$ $NO_{x\_2})_{threshold\_low}$. This increased first reduction of the first amount of nitrogen oxides $NO_{x\_1}$ is achieved, since the active control means that the first supply 230 of the first additive increases.

The lower threshold value $(NO_{2\_2}/NO_{x\_2})_{threshold\_low}$ may have a value that depends on a representation of a temperature of the catalytic filter SCRF and/or the reduction catalyst device, which value may, for example, correspond to 50%, 45%, 30%, 20% or 10%. These representations of one or several temperatures may, for example, be based on measured, modelled and/or predicted temperatures in the exhaust treatment system, using for example one or several temperature sensors described herein, which may be arranged in/at/on, upstream and/or downstream of the catalytic filter and/or the reduction catalyst device.

An increased administration of the first additive eliminates more nitrogen oxides $NO_x$, that is to say more particles of nitrogen oxides $NO_x$, which means that the value for the ratio $NO_{2\_2}/NO_{x\_2}$ increases in the reduction catalyst device, which facilitates reduction by way of so-called fast SCR in the reduction catalyst device.

According to one embodiment of the present invention, the active control of the first supply 230 is also based on a determined value $(NO_{2\_2}/NO_{x\_2})_{det}$ for a second ratio, between a second amount of nitrogen dioxide $NO_{2\_2}$ and a second amount of nitrogen oxides $NO_{x\_2}$, reaching the reduction catalyst device. The active control of the first supply 230 of the first additive is in this case carried out in such a manner, that a decreased first reduction of the first amount of nitrogen oxides $NO_{x\_1}$ is carried out in the catalytic filter 320, if the determined value $(NO_{2\_2}/NO_{x\_2})_{det}$ for the ratio is less than or equal to an upper threshold value $(NO_{2\_2}/NO_{x\_2})_{threshold\_high}$, $(NO_{2\_2}/NO_{x\_2})_{det} \leq (NO_{2\_2}/NO_{x\_2})_{threshold\_high}$. This decreased first reduction of the first amount of nitrogen oxides $NO_{x\_1}$ is achieved, since the active control means that the first supply 230 of the first additive decreases.

The upper threshold value $(NO_{2\_2}/NO_{x\_2})_{threshold\_high}$ may have a value that depends on a representation of a temperature in the catalytic filter and/or the reduction catalyst device, which value corresponds to 45%, 50%, 60% or >65%. These representations of one or several temperatures may, for example, be based, on measured, modelled and/or predicted temperatures in the exhaust treatment system, using for example one or several temperature sensors described herein, which may be arranged in/at/on, upstream and/or downstream of the catalytic filter and/or the reduction catalyst device.

With the use of the present invention, the combustion engine may, according to one embodiment, be controlled to alter the amount of nitrogen oxides $NO_x$ emitted by it, if the determined value $(NO_{2\_1}/NO_{x\_1})_{det}$ for the ratio is not optimal. The value which is considered to be optimal depends on the objective of the active control of the combustion parameters. Such an objective may be to achieve an effective soot oxidation in the catalytic filter. Another objective may be to achieve an effective reduction of nitrogen oxides in the catalytic filter.

Access to nitrogen dioxide $NO_{2\_1}$ in the exhaust stream at the catalytic filter is important, partly for the nitrogen dioxide-based soot oxidation in the filter, and partly for the reduction of nitrogen oxides $NO_{x\_1}$. The exhaust treatment system according to the present invention may therefore provide a good soot oxidation in the catalytic filter, thanks to availability of nitrogen dioxide $NO_{2\_1}$ after the first oxidation catalyst. Additionally, the reaction speed for the first reduction in the catalytic filter may be impacted by the ratio between nitrogen monoxide $NO_{\_1}$ and nitrogen dioxide $NO_{2\_1}$ in the exhaust stream reaching the catalytic filter. A more efficient first reduction in the catalytic filter may here be obtained, thanks to the previous oxidation of nitrogen oxides $NO_{\_1}$ into nitrogen dioxides $NO_{2\_1}$ in the first oxidation catalyst, in combination with the active control of the at least one parameter related to the combustion engine, which may, for example, give a desired injection strategy for the engine.

With the use of the control according to the present invention, a fuel consumption neutral manner of increasing the reaction speed over the catalytic filter and/or the reduction catalyst device in the exhaust treatment system is obtained, since the control may be implemented in such a manner, that as large a fraction as possible of the reduction occurs via reaction paths over both nitrogen oxide NO and nitrogen dioxide $NO_2$. Thus, through the control according to the invention, the fraction of the total conversion of nitrogen oxides $NO_x$ occurring via a fast reaction path, that is to say via a "fast SCR", wherein the reduction occurs via reaction paths over both nitrogen oxide NO and nitrogen dioxide $NO_2$, may be increased through active control of the level of nitrogen dioxide $NO_2$. Accordingly, the volume requirements relating to the catalyst may also be reduced.

For SCR-catalysts, and thus also for catalytic filters with reduction characteristics, mainly three types of reaction paths are defined.

One of these reaction paths is often referred to as "Standard-SCR". Here, nitrogen oxides $NO_x$ consist mainly of nitrogen monoxide NO, so that the reaction path may be written as:

$$4NH_3 + 4NO + O_2 \leftrightarrow 4N_2 + 6H_2O \qquad (i)$$

Another of these reaction paths corresponds to rapid kinetics, and is often referred to as "Fast SCR"/"fast reduction". Here, both nitrogen monoxide NO and nitrogen dioxide $NO_2$ are available in equal fractions in the nitrogen oxides $NO_x$, so that the reaction path may be written as:

$$4NH_3 + 2NO + 2NO_2 \leftrightarrow 2N_2 + 3H_2O \qquad (ii)$$

Another of these reaction paths corresponds to slow kinetics, and is often referred to as "Slow-SCR"/"slow reduction". Here, only nitrogen dioxide $NO_2$ is available for the reaction, since all nitrogen monoxide has been reduced away, and the reaction path may be written as:

$$6NO_2 + 8NH_3 \leftrightarrow 7N_2 + 12H_2O \qquad (iii)$$

At the slower kinetics in (iii) above, there is also a risk that laughing gas $N_2O$ may be produced, according to the following reaction paths:

$$8NO_2 + 6NH_3 \rightarrow 7N_2O + 9H_2O \qquad (iv)$$

$$4NO_2 + 4NH_3 + O_2 \rightarrow 4N_2O + 6H_2O \qquad (v)$$

The reaction speed for the reduction is (as the names suggest) closely connected to the paths of the reactions. The global reduction will always be a combination of these reaction paths, and probably also of several additional reactions. Thus, the reactions in the SCR-catalyst occur via the above specified reaction paths, which have different speeds.

For exhaust temperatures above approximately 280° C., a well selected SCR catalyst/SCRF will be fast, via the reaction path "Standard-SCR" (i). Thus, for these higher temperatures, there is no strong dependence on/impact of the fraction of nitrogen dioxide $NO_2$.

At lower temperatures, however, too low fractions of nitrogen dioxide $NO_2$ result in a low kinetic activity, and accordingly in an inefficient catalytic process. As mentioned above, there is a risk of a production of laughing gas $N_2O$ in a component arranged downstream, wherein the risk is particularly great, for example, for precious metal based catalysts, such as for a slip-catalyst SC, and/or an oxidation catalyst DOC. Thus, it is advantageous, with the use of the present invention, to be able to control the fraction of nitrogen dioxide $NO_{2\_1}$, $NO_{2\_2}$ in the nitrogen oxides $NO_{x\_1}$, $NO_{x\_2}$, so that this is above a minimum suitable value $(NO_{2\_1}/NO_{x\_1})_{threshold\_low}$, $(NO_{2\_2}/NO_{x\_2})_{threshold\_low}$ and below a maximum suitable value $(NO_{2\_1}/NO_{x\_1})_{threshold\_high}$, $(NO_{2\_2}/NO_{x\_2})_{threshold\_high}$ when the nitrogen oxides reach the catalytic filter SCRF and the reduction catalyst device, respectively.

The thermodynamic equilibrium state between nitrogen oxides NO and nitrogen dioxide $NO_{\_1}$, $NO_{\_2}$ and nitrogen dioxide $NO_{2\_1}$, $NO_{2\_2}$ means that it is problematic to control the fraction of nitrogen dioxide $NO_{2\_1}$, $NO_{2\_2}$ in the nitrogen oxides $NO_{x\_1}$, $NO_{x\_2}$ over a broad temperature range. Geometry, amounts and/or distribution of precious metal, as well as soot deposits are some of the parameters impacting the value for the ratio $NO_{2\_1}/NO_{x\_1}$, $NO_{2\_2}/NO_{x\_2}$, which is obtained downstream of oxidizing substrates in the exhaust treatment system, that is to say, for example, downstream of the first oxidation catalyst.

The present invention uses the discovery that, in modern diesel engines, additional possibilities are opened up for control of the fraction of nitrogen dioxide $NO_2$ in nitrogen oxides $NO_x$. The present invention here uses the possibility of controlling the engine's level of nitrogen oxides $NO_x$. This is possible since the fraction of nitrogen dioxide $NO_2$ in the nitrogen oxides $NO_x$ depends on the level of nitrogen oxides $NO_x$.

For exhaust treatment systems comprising a component coated with precious metal, such as the oxidation catalyst DOC, arranged upstream of the catalytic filter SCRF, the first ratio $NO_{2\_1}/NO_{x\_1}$ for the exhaust stream reaching the catalytic filter SCRF, or other components arranged downstream, may thus be controlled.

To compensate for the limited availability of heat at, for example, cold starts and operation with low load, it is desirable to use a so-called fast reduction/SCR ("Fast SCR"). At a fast reduction/SCR, the reduction is controlled to occur, to as great an extent as possible, via reaction paths over both nitrogen oxide NO and nitrogen dioxide $NO_2$. Thus, at fast reduction/SCR the reaction uses equal parts of nitrogen oxide NO and nitrogen dioxide $NO_2$, which means that an optimal value for the molar ratio $NO_2/NO_x$ may for example be close to 50%. Through the use of the present invention, the molar ratio $NO_2/NO_x$ may be controlled to be closer to this optimal value, than what would be the case if the control according to the present invention had not been used. With the use of the present invention, a more efficient and predictable reduction of nitrogen dioxides $NO_x$ is thus achieved. As a result, for example, adaptations of urea dosage give more reliable results.

As mentioned above, the catalytic filter SCRF uses additive at the reduction of nitrogen oxides $NO_{x\_1}$ in the exhausts. Additive is injected into the exhaust stream resulting from the combustion engine, upstream of the catalyst, and is adsorbed (deposited) in the catalytic coating with reduction characteristics, so that a redox-reaction may occur between nitrogen oxides $NO_{x\_1}$ in the exhausts and the additive.

The active control of the first supply 230 of the first additive may, for example, be based also on a coverage degree/filling degree of additive for the catalytic filter.

The active control of the first supply 230 of the first additive may, for example, be based also on at least one catalytic characteristic for the catalytic filter SCRF.

The active control of the first supply 230 of the first additive may, for example, be based also on a temperature for the catalytic filter and/or for the reduction catalyst device.

The first amount of nitrogen oxides $NO_{x\_1}$ reaching the catalytic filter may, according to one embodiment, correspond to a first ratio $NO_{2\_1}/NO_{x\_1}$, between a first amount of nitrogen dioxide $NO_{2\_1}$ and a first amount of nitrogen oxides $NO_{x\_1}$, reaching the catalytic filter SCRF. A value $(NO_{2\_1}/NO_{x\_1})_{det}$ may be determined for this first ratio $NO_{2\_1}/NO_{x\_1}$, for example in the form of a measured, modelled and/or predicted value. Predicted values may, for example, be determined based on a representation of a road section ahead of the vehicle, where the representation may be based, for example, on positioning information, such as GPS-information, and map data.

The second amount of nitrogen oxides $NO_{x\_2}$ reaching the reduction catalyst device may, according to one embodiment, correspond to a second ratio $NO_{2\_2}/NO_{x\_2}$, between a second amount of nitrogen dioxide $NO_{2\_2}$ and a second amount of nitrogen oxides $NO_{x\_2}$ reaching the reduction catalyst device. A value $(NO_{2\_2}/NO_{x\_2})_{det}$ may be determined for the second ratio $NO_{2\_2}/NO_{x\_2}$, for example in the form of a measured, modelled and/or predicted value. The predicted value may, as mentioned above, be based, for example, on GPS-information and map data.

According to one embodiment of the present invention, the active control of the first supply 230 of the first additive is also based on the determined value $(NO_{2\_2}/NO_{x\_2})_{det}$ for the second ratio, between the second amount of nitrogen dioxide $NO_{2\_2}$ and the second amount of nitrogen oxides $NO_{x\_2}$, reaching the reduction catalyst device. Thus, the first supply 230 may be controlled in such a way, that the reduction in the reduction catalyst device occurs, to as great an extent as possible, via reaction paths over both nitrogen oxides NO, and nitrogen dioxide $NO_2$. In fast reduction, the reaction uses equal parts of nitrogen monoxide NO and nitrogen dioxide $NO_2$, which means that an optimal value for the molar ratio $NO_2/NO_x$ is nearly 50%.

This active control of the first supply 230 may here achieve a reduction of a value $NO_{2\_2}/NO_{x\_2}$ for this second ratio, since the second amount of nitrogen oxides $NO_{x\_2}$ reaching the second device increases. This may be achieved by way of the active control of the first supply being carried out so that the first supply decreases, whereby the first reduction of the first amount of nitrogen oxides $NO_{x\_1}$ in the catalytic filter decreases. Thus, an increase of the second amount of nitrogen oxides $NO_{x\_2}$ is achieved. In other words, the active control means, that a high determined value $(NO_{2\_2}/NO_{x\_2})_{det}$ for the second ratio results in supply of less additive than what a low determined value $(NO_{2\_2}/NO_{x\_2})_{det}$ for the second ratio results in.

This may also be described as the first supply 230 of additive decreasing, if the determined value $(NO_{2\_2}/NO_{x\_2})_{det}$ for the second ratio is greater than an upper threshold value $(NO_{2\_2}/NO_{x\_2})_{threshold\_high}$, $(NO_{2\_2}/NO_{x\_2})_{det} > (NO_{2\_2}/NO_{x\_2})_{threshold\_high}$.

This upper threshold value $(NO_{2\_2}/NO_{x\_2})_{threshold\_high}$ may have a value that depends on catalytic characteristics for the catalytic filter SCRF and/or catalytic characteristics for the reduction catalyst device. The upper threshold value $(NO_{2\_2}/NO_{x\_2})_{threshold\_high}$ may also have a value that depends on a catalyst type for the catalytic filter SCRF and/or for the reduction catalyst device. The upper threshold value $(NO_{2\_2}/NO_{x\_2})_{threshold\_high}$ may also have a value that depends on a temperature interval, within which the catalytic filter and/or the reduction catalyst device are active. The upper threshold value $(NO_{2\_2}/NO_{x\_2})_{threshold\_high}$ may also have a value that depends on a coverage level of additive for the catalytic filter and/or the reduction catalyst device. The upper threshold value $(NO_{2\_2}/NO_{x\_2})_{threshold\_high}$ may also have a value that depends on a temperature at the catalytic filter and/or the reduction catalyst device.

The upper threshold value $(NO_{2\_2}/NO_{x\_2})_{threshold\_high}$ may, for example, have a value within the interval $(NO_{2\_2}/NO_{x\_2})_{threshold\_high} > 50\%$, preferably within the interval $50\% > (NO_{2\_2}/NO_{x\_2})_{threshold\_high} \geq 85\%$, and more preferably within the interval $60\% > (NO_{2\_2}/NO_{x\_2})_{threshold\_high} \geq 75\%$.

According to another embodiment of the present invention, the active control of the first supply 230 achieves an increase of a value $NO_{2\_2}/NO_{x\_2}$ for the second ratio. This increase is achieved, since the second amount of nitrogen oxides $NO_{x\_2}$ is decreased. The increase of the value $NO_{2\_2}/NO_{x\_2}$ for the second ratio may here be achieved by way of the active control of the first supply being carried out in such a manner, that the first reduction increases in the catalytic filter. The increased reduction in the catalytic filter results in a decrease of the second amount of nitrogen oxides $NO_{x\_2}$. In other words, this first supply 230 may be based on the determined value $(NO_{2\_2}/NO_{x\_2})_{det}$ for the second ratio, so that a low determined value $(NO_{2\_2}/NO_{x\_2})_{det}$ thus results in supply of more additive, than what a high determined value $(NO_{2\_2}/NO_{x\_2})_{det}$ results in.

This may also be expressed as the first supply 230 being increased, if the determined value $(NO_{2\_2}/NO_{x\_2})_{det}$ for the second ratio is less than, or equal to, a lower threshold value $(NO_{2\_2}/NO_{x\_2})_{threshold\_low}$, $(NO_{2\_2}/NO_{x\_2})_{det} \leq (NO_{2\_2}/NO_{x\_2})_{low}$. This lower threshold value $(NO_{2\_2}/NO_{x\_2})_{threshold\_low}$ may have a value that depends on catalytic characteristics for the catalytic filter and/or the reduction catalyst device. The lower threshold value $(NO_{2\_2}/NO_{x\_2})_{threshold\_low}$ may also have a value that depends on a catalyst type for the catalytic filter and/or the reduction catalyst device. The lower threshold value $(NO_{2\_2}/NO_{x\_2})_{threshold\_low}$ may also have a value that depends on a temperature interval, within which the catalytic filter and/or the reduction catalyst device are active. The lower threshold value $(NO_{2\_2}/NO_{x\_2})_{threshold\_low}$ may also have a value that depends on a coverage level of additive for the catalytic filter and/or the reduction catalyst device. The lower threshold value $(NO_{2\_2}/NO_{x\_2})_{threshold\_low}$ may also have a value that depends on a coverage level of additive for the catalytic filter and/or the reduction catalyst device. The lower threshold value $(NO_{2\_2}/NO_{x\_2})_{threshold\_low}$ may also have a value that depends on a temperature at the catalytic filter and/or the reduction catalyst device. The lower threshold value $(NO_{2\_2}/NO_{x\_2})_{threshold\_low}$ may for example have a value interval, $(NO_{2\_2}/NO_{x\_2})_{threshold\_low} < 50\%$, preferably within the interval $10\% \leq (NO_{2\_2}/NO_{x\_2})_{threshold\_low} \leq 40\%$, and more preferably within the interval $20\% \leq (NO_{2\_2}/NO_{x\_2})_{threshold\_low} \leq 60\%$.

As mentioned above, the second amount of nitrogen oxides $NO_{x\_2}$ corresponds to a second ratio $NO_{2\_2}/NO_{x\_2}$, between a second amount of nitrogen dioxide $NO_{2\_2}$ and a second amount of nitrogen oxides $NO_{x\_2}$, reaching the reduction catalyst device.

The determined values $(NO_{2\_1}/NO_{x\_1})_{det}$, $(NO_{2\_2}/NO_{x\_2})_{det}$ may for example consist of predicted, modelled and/or measured values, where predicted values may, for example, be determined based on a representation of a road section ahead.

A person skilled in the art will realize that a method for treatment of an exhaust stream according to the present invention may also be implemented in a computer program, which when executed in a computer will cause the computer to execute the method. The computer program usually consists of a part of a computer program product 403, where the computer program product comprises a suitable non-volatile/permanent/persistent/durable digital storage medium on which the computer program is stored. Said non-volatile/permanent/persistent/durable computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 4:
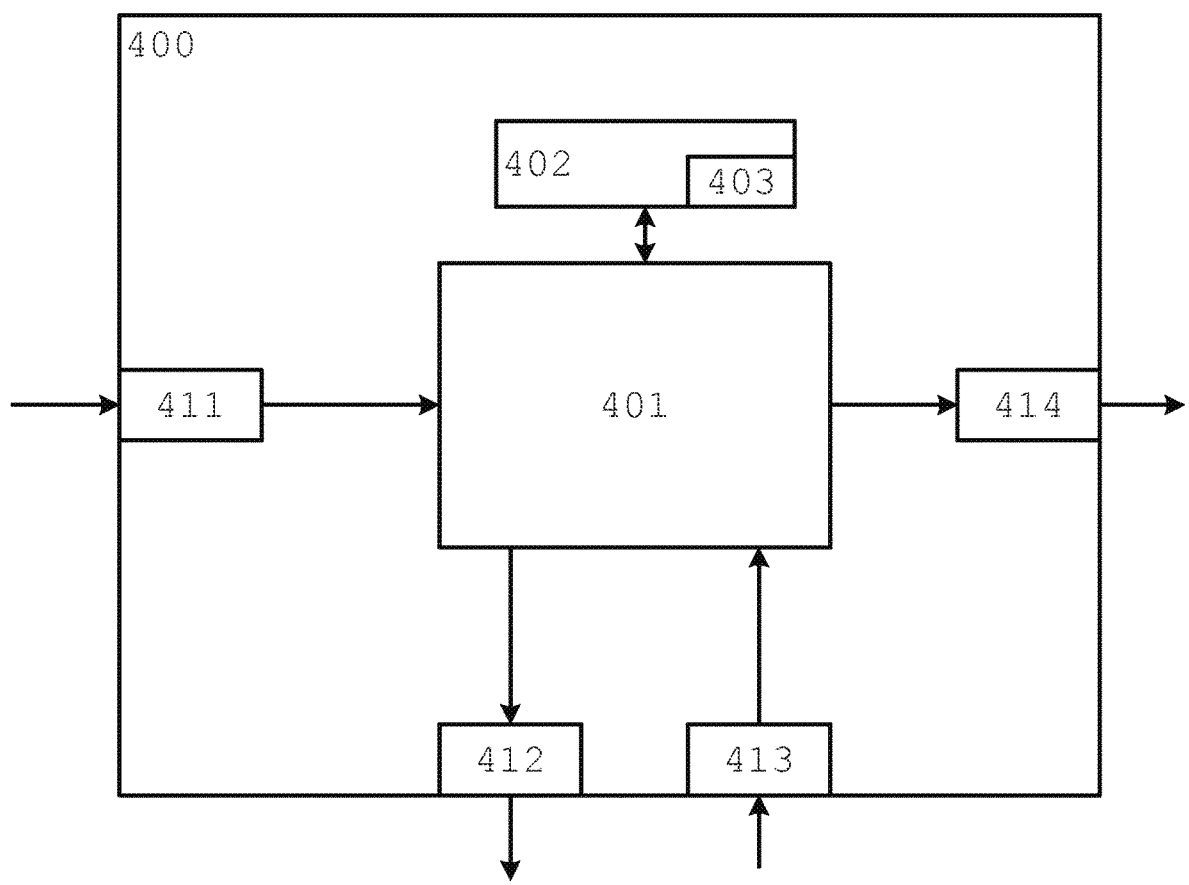
FIG. 4 shows a control device, in which a method according to the present invention may be implemented.

FIG. 4 schematically shows a control device 400. The control device 400 comprises a calculation device 401, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation device 401 is connected to a memory unit 402 installed in the control device 400, providing the calculation device 401 with e.g. the stored program code, and/or the stored data which the calculation device 401 needs in order to be able to carry out calculations. The calculation device 401 is also set up to store interim or final results of calculations in the memory device 402.

Further, the control device 400 is equipped with devices 411, 412, 413, 414 for receiving and sending of input and output signals, respectively These input and output signals may contain wave shapes, pulses or other attributes, which may be detected as information by the devices 411, 413 for the receipt of input signals, and may be converted into signals that may be processed by the calculation device 401. These signals are then provided to the calculation device 401. The devices 412, 414 for sending output signals are arranged to convert the calculation result from the calculation unit 401 into output signals for transfer to other parts of the vehicle's control system, and/or the component(s) for which the signals are intended, for example the first and/or second dosage devices.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation device 401, and that the above-mentioned memory may consist of the memory device 402.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than what is shown in FIG. 4, which is well known to a person skilled in the art within the technology area.

The present invention, in the embodiment displayed, is implemented in the control device 400. The invention may, however, also be implemented wholly or partly in one or several other control devices, already existing in the vehicle, or in a control device dedicated to the present invention.

Here, and in this document, control devices are often described as being arranged to carry out steps in the method according to the invention. This also comprises that the devices are adapted and/or set up to carry out these method steps. For example, these control devices may correspond to different groups of instructions, for example in the form of program code, which is fed into, and used by a processor, when the respective control device is active/used to implement the respective method steps.

Figure 3:
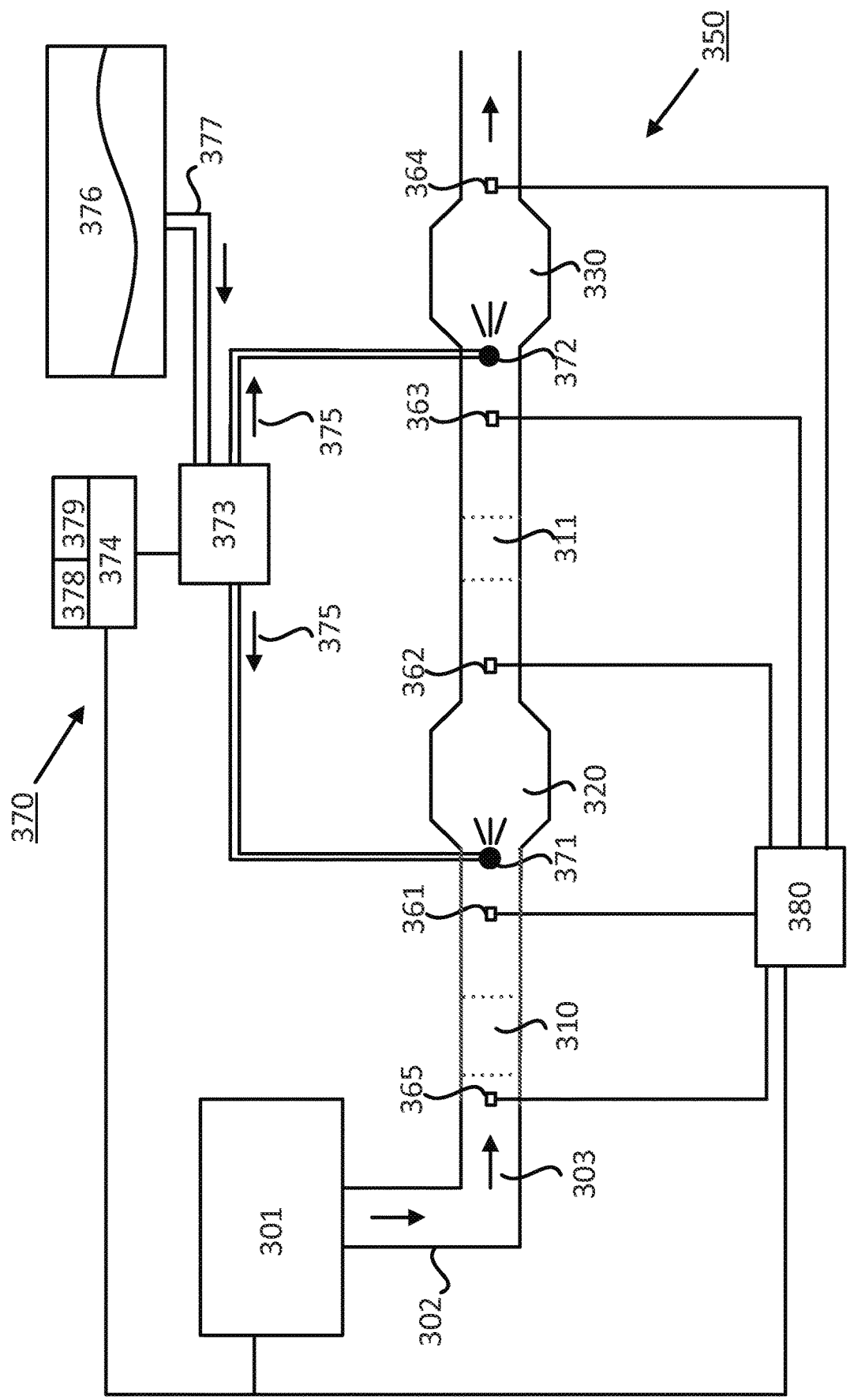
FIG. 3 shows an example of an exhaust treatment system according to one embodiment of the present invention.

FIG. 3 schematically shows an exhaust treatment system 350 according to one aspect of the present invention, which system is connected to a combustion engine 301 via an exhaust conduit 302. Exhausts generated at combustion in the engine 301 and the exhaust stream 303 (indicated with arrows) are led to a first oxidation catalyst 310, which is arranged for oxidation 210 of compounds comprising one or more of nitrogen, carbon and hydrogen in the exhaust stream 303.

The exhaust stream 303 is led past a first dosage device 371, arranged in the exhaust treatment system 350 to provide a first supply 230 of a first additive into the exhaust stream 303, before it reaches the catalytic filter 320. The first additive supplied to the exhaust stream 303 at the first supply 230 is used at a first reduction 240 of a first amount of nitrogen oxides $NO_{x\_1}$ via the catalytic filter 320.

According to one embodiment of the invention, a first hydrolysis catalyst, which may consist of substantially any suitable hydrolysis coating, and/or a first mixer, may be arranged in connection with the first dosage device 371. The first hydrolysis catalyst, and/or the first mixer, are then used to increase the speed of the decomposition of urea into ammonia, and/or to mix the additive with the emissions, and/or to vaporize the additive.

The catalytic filter 320 is arranged downstream of the first dosage device 371, and consists of a particulate filter with an at least partly catalytic coating with reduction characteristics, which is arranged for catching and oxidizing of soot particles, and to carry out a first reduction 240 of a first amount of nitrogen oxides $NO_{x\_1}$ reaching the catalytic filter 320. The catalytic reaction in the catalytic filter 320 uses the first additive at the first reduction.

The exhaust treatment system 350 according to the present invention also comprises a control device 380, arranged to provide a determination 220 of a value $(NO_{2\_1}/NO_{x\_1})_{det}$ for a ratio between a first amount of nitrogen dioxide $NO_{2\_1}$ and a first amount of nitrogen oxides $NO_{x\_1}$, leaving the first oxidation catalyst 310 and thus reaching the catalytic filter 320. The control device 380 is also arranged to provide an active control 230 of the first dosage device 371, which is arranged downstream of the first oxidation catalyst 310 and upstream of the catalytic filter 320, in order to carry out a first supply 230 of a first additive into the exhaust stream 303, based on the determined value $(NO_{2\_1}/NO_{x\_1})_{det}$ for the ratio.

According to one embodiment of the present invention, the exhaust treatment system 350 also comprises a second dosage device 372, arranged downstream of the catalytic filter 320, that is to say upstream of the reduction catalyst device 330, to provide a second supply 260 of a second additive to the exhaust stream 303. For this embodiment, the second additive is used, which is supplied to the exhaust stream by the second dosage device 372 during the second reduction 270 in the reduction catalyst device 330.

The exhaust treatment system 350 also comprises, according to one embodiment, at least one dosage control device 374, arranged to control at least one of the first supply 230 and the second supply 260.

In other words, the dosage control device 374 controls one or several of the first dosage device 371 and the second dosage device 372, and/or pumps or similar devices, which supply these dosage devices 371, 372 with additive. According to one embodiment, this dosage is controlled in such a way that a sufficient amount of additive is supplied into the exhaust stream via the first dosage device 371, in order to achieve the active control of the first reduction in the catalytic filter 320.

Through the use of the exhaust treatment system 350 according to the present invention, the active control of the level of nitrogen dioxide $NO_2$ may be used to increase or decrease the level of nitrogen dioxide $NO_2$ in those driving modes, for which this is necessary. Thus, an exhaust treatment system may be created, which requires less precious metal and accordingly also is cheaper to manufacture.

With the use of the control according to the present invention, a fuel consumption neutral manner of increasing the reaction speed of reductions in the exhaust treatment system is obtained, since the control may be implemented in such a manner, that as large a fraction as possible of the reduction occurs via reaction paths over both nitrogen oxide NO and nitrogen dioxide $NO_2$.

The load on the reduction catalysts increases for some embodiments due to the increased level of nitrogen oxides $NO_x$. However, the catalysts that carry out the reduction of nitrogen oxides $NO_x$ will have good conditions for coping with this load, since the increase occurs primarily at an approximate exhaust temperature of around 260-340° C., whereat the catalysts have rather a good performance.

By using the present invention, a more efficient and predictable reduction of nitrogen oxides $NO_x$ is obtained. This means that, for example, the control of the dosage of additive will provide more reliable results.

According to one embodiment of the present invention, the at least partly catalytic coating, which is comprised in the catalytic filter, may have both reduction characteristics and oxidation characteristics.

According to another embodiment of the present invention, the exhaust treatment system may comprise a second oxidation catalyst 311, arranged downstream of the catalytic filter 320, in order to carry out a second oxidation 250 of compounds comprising one or more of nitrogen, carbon and hydrogen in the exhaust stream 303. Here, the second oxidation catalyst 311 may thus be followed downstream by a second dosage device 372, arranged to provide a second supply 260 of a second additive to the exhaust stream 303, which additive is used at the second reduction 270 in the reduction catalyst device 330, downstream of the second dosage device 372.

The first oxidation catalyst $DOC_1$ 310 and/or the second oxidation catalyst $DOC_2$ 311 is at least partly coated with a catalytically oxidizing coating, wherein this oxidizing coating may comprise at least one precious metal, for example platinum.

The exhaust treatment system 350 may, according to one embodiment, comprise at least one external injector supplying the first 310 and/or the second 311 oxidation catalyst, with hydrocarbons HC. The engine may in this case also be seen as an injector, supplying the first 310, and/or the second 311 oxidation catalyst with hydrocarbons HC, where the hydrocarbons HC may be used to generate heat.

Figure 5:
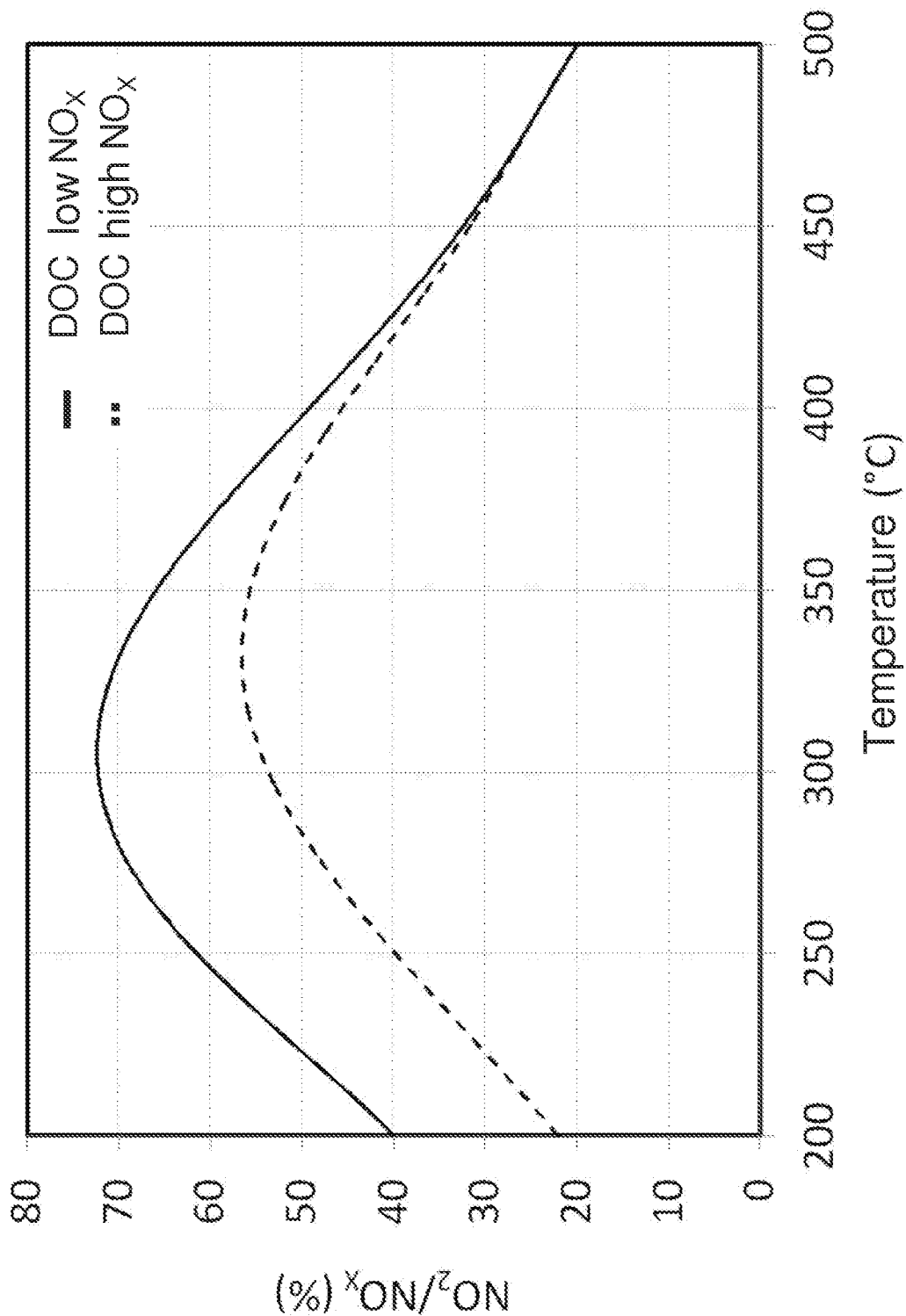
FIG. 5 shows an example of an effect of an increased $NO_x$-level.

By actively controlling the level of nitrogen oxides $NO_x$ reaching the at least one substrate with oxidizing coating, which may, for example, be comprised in a first $DOC_1$, in a second $DOC_2$, and/or in the catalytic filter 320 SCRF, an adjustment of the fraction of nitrogen dioxide $NO_2$ reaching a reduction catalyst device arranged downstream, may be obtained. This means that the reduction catalyst device provides a turnover that is more predictable. For example, an increase of the amount of nitrogen oxides $NO_x$ produced by the engine may be desirable in those cases, where it is expected that there is a risk of the fraction of nitrogen dioxides $NO_2$ exceeding a maximum desired value. As an example, FIG. 5 shows an effect obtained for the fraction of nitrogen dioxide $NO_2$ at an increase of the level of nitrogen oxides $NO_x$ from a low value, for example 300 ppm, to a higher value, for example 1400 ppm. As described by the figure, the value for the ratio $NO_2/NO_x$ at DOC, and/or DPF, drops from approximately 70% to between 50% and 60%, when the level for nitrogen oxides $NO_x$ increases from 300 to 1400 ppm. This decrease of the value for the ratio $NO_2/NO_x$ considerably improves the conditions for "fast SCR" as described above.

The load on the catalytic filter SCRF and/or the reduction catalyst device increases as a result of the increased level for nitrogen oxides $NO_x$. Since the increase occurs primarily at an approximate exhaust temperature of around 260-340° C., at which there is a risk of the at least one oxidizing substrate producing $NO_2/NO_x$>50%, the catalytic filter 320 and/or the reduction catalyst device 330 will have good conditions for coping with this load. At these temperatures, that is to say at 260-340° C., the catalytic filter 320 and/or the reduction catalyst device 330, depending on the respective specifications, have rather a good performance. Additionally, there are rather good conditions for vaporization of reductant at these temperatures.

As a non-limiting example, the control may here be carried out in such a way that the administration of the first additive very rarely corresponds to an $NO_x$-conversion, exceeding the value for twice the ratio between the fraction of nitrogen dioxide $NO_2$ and the fraction of nitrogen oxides $NO_x$, that is to say that the dosage of the first additive corresponds to an $NO_x$-conversion less than $(NO_2/NO_x)*2$. If, for example, $NO_2/NO_x=30\%$, the dosage of the first additive may be controlled to correspond to an $NO_x$-conversion smaller than 60% (2*30%=60%), for example an $NO_x$-conversion equal to approximately 50%, which would guarantee that the reaction speed over the catalytic filter 320 is fast, and that 5% of nitrogen dioxide $NO_2$ remains for $NO_2$-based soot oxidation through the catalytic filter 320.

According to one embodiment of the present invention, the first, and/or the second additive, comprises ammonia $NH_3$ or urea, from which ammonia may be generated/formed/released. This additive may for example consist of AdBlue. The first and the second additive may be of the same type, or may be of different types.

According to one embodiment of the present invention, the exhaust treatment system 350 comprises a system 370 for supply of additive, which comprises at least one pump 373 arranged to supply the first 371 and the second 372 dosage devices with additive, that is to say for example ammonia or urea.

One example of such a system 370 for supply of additive is displayed schematically in FIG. 3, where the system comprises the first dosage device 371 and the second dosage device 372, which are arranged upstream of the catalytic filter 320, and upstream of the reduction catalyst device 330, respectively. The first and second dosage devices 371, 372, often consisting of dosage nozzles administering additive to, and mixing such additive with, the exhaust stream 303, are supplied with additive by the at least one pump 373, via conduits 375 for additive. The at least one pump 373 obtains additive from one or several tanks 376 for additive, via one or several conduits 377 between the tank/tanks 376, and the at least one pump 373. It should be realized that the additive may be in liquid form and/or gaseous form. Where the additive is in liquid form, the pump 373 is a liquid pump, and the one or several tanks 376 are liquid tanks. Where the additive is in gaseous form, the pump 373 is a gas pump, and the one or several tanks 376 are gas tanks. If both gaseous and liquid additives are used, several tanks and pumps are arranged, wherein at least one tank and one pump are set up to supply liquid additive, and at least one tank and one pump are set up to supply gaseous additive.

According to one embodiment of the invention, the at least one pump 373 comprises a joint pump, which feeds both the first 371 and the second 372 dosage device with the first and the second additive, respectively. According to another embodiment of the invention, the at least one pump comprises a first and a second pump, which feed the first 371 and the second 372 dosage device, respectively, with the first and the second additive, respectively. The specific function of the additive system 370 is well described in prior art technology, and the exact method for the injection of additive is therefore not described in any further detail herein. Generally, however, the temperature at the point of injection/SCR-catalyst should be above a lower threshold temperature to avoid precipitates and formation of unwanted by-products, such as ammonium nitrate $NH_4NO_3$. An example of a value for such a lower threshold temperature may be approximately 200° C. According to one embodiment of the invention, the system 370 for supply of additive comprises a dosage control device 374, arranged to control the at least one pump 373, in such a manner that the additive is supplied to the exhaust stream. The dosage control device 374 comprises, according to one embodiment, a first pump control device 378 arranged to control the at least one pump 373, in such a manner that a first dosage of the first additive is supplied to the exhaust stream 303, via the first dosage device 371. The dosage control device 374 also comprises a second pump control device 379, arranged to control the at least one pump 373, in such a manner that a second dosage of the second additive is supplied to the exhaust stream 303, via the second dosage device 372.

The first and second additives usually consist of the same type of additive, for example urea. However, according to one embodiment of the present invention, the first additive and the second additive may be of different types, for example urea and ammonia, which means that the dosage to each one of the catalytic filter 320 and the reduction catalyst device 330, and accordingly also the function for each of the catalytic filter 320 and the reduction catalyst device 330, may be optimized also with respect to the type of additive. If different types of additive are used, the tank 376 comprises several sub-tanks, which contain the different respective types of additive. One or several pumps 373 may be used to supply the different types of additive to the first dosage device 371 and the second dosage device 372. As mentioned above, the one or several tanks, and the one or several pumps, are adapted according to the state of the additive, that is to say according to whether the additive is gaseous or liquid.

The one or several pumps 373 are thus controlled by a dosage control device 374, which generates control signals for the control of supply of additive, so that a desired amount is injected into the exhaust stream 303 with the help of the first 371 and the second 372 dosage device, respectively, upstream of the catalytic filter 320 and the reduction catalyst device 330, respectively. In more detail, the first pump control device 378 is arranged to control either a joint pump, or a pump dedicated to the first dosage device 371, so that the first dosage is controlled to be supplied to the exhaust stream 303 via the first dosage device 371. The second pump control device 379 is arranged to control either a joint pump, or a pump dedicated to the second dosage device 372, so that the second dosage is controlled to be supplied to the exhaust stream 303 via the second dosage device 372.

The at least one control device 374 is drawn in the figure comprising separately marked units 378, 379. These units 378, 379 may be logically separate, but physically implemented in the same unit, or they may be both logically and physically jointly arranged/implemented. For example, these units 378, 379 may correspond to different groups of instructions, for example in the form of program code, which is fed into, and used by a processor, when the respective unit is active/used to implement the respective method steps.

The exhaust treatment system 350 may also equipped with one or several sensors, such as one or several $NO_x$—, $NO_2$— and/or temperature sensors 361, 362, 363, 364, 365, arranged, for example, upstream of a potential oxidation catalyst 310 arranged upstream of the catalytic filter, at the inlet to the catalytic filter 320, at the outlet from the catalytic filter 320, at the inlet to the reduction catalyst device 330 and/or at the outlet from the reduction catalyst device 330, for determination of nitrogen oxides, nitrogen dioxide and/or temperatures in the exhaust treatment system. The temperature sensors 361, 362, 363, 364, 365 may, as illustrated in FIG. 3, be arranged upstream and/or downstream of the components 310, 320, 330 in the exhaust treatment system 350. Temperature sensors may also be arranged in/at/on one or more of the components 310, 320, 330 in the exhaust treatment system 350.

The control device 380 may be arranged to provide control signals, and/or signals corresponding to measurements carried out by the one or several $NO_x$—, $NO_2$— and/or the temperature sensors 361, 362, 363, 364, 365, to at least one dosage control device 374. The at least one dosage control device 374 thereafter bases the control of supplying dosage substance on such control signals, and/or measurement signals, so that the above mentioned active control of the first impact is obtained.

The control device 380 may also be arranged to provide control signals, and/or signals corresponding to measurements carried out by the one or several $NO_x$—, $NO_2$— and/or the temperature sensors 361, 362, 363, 364, 365 to the combustion engine 301 and/or an engine control device. The combustion engine 301, and/or the engine control device, thereafter base the control of the engine on these control signals, and/or measurement signals, so that the above mentioned active control of the first impact is also obtained through a control of the temperature, and/or the exhaust environment.

The method according to the present invention may be implemented in substantially all exhaust treatment systems comprising the above described catalytic filter 320, the above described reduction catalyst device 330, and the active control of dosage/supply of additive. Each of the catalytic filter 320 and the reduction catalyst device 330 may be arranged in a number of ways and have a number of different characteristics/functions.

According to different embodiments of the present invention, the reduction catalyst device 330 comprises one from the group of:
a selective catalytic reduction catalyst SCR;
a selective catalytic reduction catalyst SCR followed downstream by a slip-catalyst SC, wherein the slip-catalyst SC is arranged to oxidize a residue of additive, and/or to assist the selective catalytic reduction catalyst SCR with an additional reduction of nitrogen oxides $NO_x$ in the exhaust stream 303; and a slip-catalyst SC, which is arrange primarily for reduction of nitrogen oxides $NO_x$ and secondarily for oxidation of additive in the exhaust stream 303.

In this document, a selective catalytic reduction catalyst SCR means a traditional SCR-catalyst (Selective Catalytic Reduction). SCR catalysts usually use an additive, often ammonia $NH_3$, or a composition from which ammonia may be generated/formed, which is used for the reduction of nitrogen oxides $NO_x$ in the exhausts. The additive is injected into the exhaust stream resulting from the combustion engine, upstream of the catalyst as described above. The additive added to the catalyst is adsorbed (stored) in the catalyst, in the form of ammonia $NH_3$, so that a redox-reaction may occur between nitrogen oxides $NO_x$ in the exhausts and ammonia $NH_3$ available via the additive.

Slip-catalyst SC, as used in this document, means a catalyst which is arranged to oxidize additive, and/or to assist a selective catalytic reduction catalyst SCR with a reduction of nitrogen oxides $NO_x$ in said exhaust stream 303.

The slip-catalyst SC is thus a catalyst, which is arranged to oxidize additive in the exhaust stream, and which is arranged to be able to reduce residues of nitrogen oxides $NO_x$ in the exhaust stream. In more detail, such a slip-catalyst SC is arranged primarily to reduce nitrogen oxides $NO_x$, and secondarily to oxidize additive. In other words, the slip-catalyst SC may take care of slip-residues of both additive and nitrogen oxides $NO_x$. This may also be described as the slip-catalyst SC being an extended ammoniac slip catalyst ASC, which is also set up for reduction of nitrogen oxides $NO_x$ in the exhaust stream, so that a general multifunctional slip-catalyst SC is obtained, taking care of several types of slip, meaning it takes care of both additive and nitrogen oxides $NO_x$. According to one embodiment of the present invention, at least the following reactions may for example be carried out in a multifunctional slip-catalyst SC, which both reduces nitrogen oxides $NO_x$ and oxidize additive:

$$NH_3 + O_2 \rightarrow N_2; \tag{vi}$$

and $$NO_x + NH_3 \rightarrow N_2 + H_2O. \tag{vii}$$

Here, the reaction according to the equation vi provides an oxidation of the additive, for example residues of additive, which may comprise ammonia. The reaction according to the equation vii results in a reduction of nitrogen oxides $NO_x$.

Accordingly, the additive, such as residues of ammonia $NH_3$, isocyanic acid HNCO, urea or similar may be oxidize. These residues of additive, that is to say ammonia $NH_3$, HNCO, urea or similar, may here also be used to oxidize nitrogen oxides $NO_x$.

In order to obtain these characteristics, that is to say to obtain a multifunctional slip-catalyst, the slip-catalyst may, according to one embodiment, comprise one or several substances comprised in platinum metals (PGM; Platinum Group Metals), that is to say one or several of iridium, osmium, palladium, platinum, rhodium and ruthenium. The slip-catalyst may also comprise one or several other substances, which give the slip-catalyst similar characteristics as platinum group metals. The slip-catalyst may also comprise an $NO_x$-reducing coating, where the coating may for example comprise Cu- or Fe-zeolite or vanadium. Zeolite may here be activated with an active metal, such as for example copper (Cu) or iron (Fe).

The system according to the present invention may be arranged to carry out all of the method embodiments described above and in the claims, wherein the system for the respective embodiment achieves the above described advantages for the respective embodiment.

A person skilled in the art will also realize that the above system may be modified according to the different embodiments of the method according to the invention. In addition, the invention relates to a motor vehicle 100, for example a truck or a bus, comprising at least one system for treatment of an exhaust stream.

The present invention is not limited to the embodiments of the invention described above, but relates to and comprises all embodiments within the scope of the enclosed independent claims.

The invention claimed is:

1. A method for treatment of an exhaust stream, resulting from a combustion in a combustion engine, passing through an exhaust treatment system and comprising nitrogen oxides $NO_x$, wherein said nitrogen oxides $NO_x$ comprise nitrogen monoxide NO and nitrogen dioxide $NO_2$, said method comprising:
    a first oxidation of compounds comprising one or more of nitrogen, carbon and hydrogen in said exhaust stream, wherein said first oxidation is carried out by a first oxidation catalyst arranged in said exhaust treatment system;
    a determination of a value $(NO_{2\_1}/NO_{x\_1})_{det}$ for a ratio between a first amount of nitrogen dioxide $NO_{2\_1}$ and a first amount of nitrogen oxides $NO_{x\_1}$, leaving said first oxidation catalyst;
    a first supply of a first additive into said exhaust stream with the use of a first dosage device, arranged downstream of said first oxidation catalyst and upstream of a catalytic filter;
    a first reduction of at least said first amount of nitrogen oxides $NO_{x\_1}$ via a catalytic reaction in the catalytic filter, arranged downstream of said first dosage device, wherein said catalytic filter consists of a particulate filter with an at least partly catalytic coating with reduction characteristics, which is arranged for catching and oxidizing of soot particles, and to carry out said first reduction of said first amount of nitrogen oxides $NO_{x\_1}$, and wherein a catalytic reaction for said first reduction uses said first additive, and wherein said first supply is actively controlled based on said determined value $(NO_{2\_1}/NO_{x\_1})_{det}$ to thereby control the amount of nitrogen dioxide $NO_2$ provided to the input of the catalytic filter to thereby ensure both oxidation of soot particles and reduction of nitrogen oxides $NO_x$ in the catalytic filter;
    a second supply of a second additive into said exhaust stream with the use of a second dosage device, arranged downstream of said catalytic filter; and
    a second reduction of a second amount of nitrogen oxides $NO_{x\_2}$ reaching a reduction catalyst device, arranged downstream of said second dosage device, wherein said second reduction uses said first and/or second additive.

2. A method according to claim 1, wherein said active control of said first supply is also based on a determined value $(NO_{2\_2}/NO_{x\_2})_{det}$ for a second ratio, between a second amount of nitrogen dioxide $NO_{2\_2}$ and a second amount of nitrogen oxides $NO_{x\_2}$, reaching said reduction catalyst device.

3. A method according to claim 1, wherein said active control of said first supply of said first additive results in an active control of said first reduction of said first amount of nitrogen oxides $NO_{x\_1}$, which is carried out in said catalytic filter.

4. A method according to claim 1, wherein said first reduction of said first amount of nitrogen oxides $NO_{x\_1}$ is achieved by way of said first additive reacting with said first amount of nitrogen oxides $NO_{x\_1}$ in said catalytic filter.

5. A method according to claim 1, wherein said first reduction of said first amount of nitrogen oxides $NO_{x\_1}$ is achieved by way of a first amount of nitrogen dioxides $NO_{2\_1}$, comprised in said first amount of nitrogen oxides $NO_{x\_1}$, reacting with said soot particles at said oxidation of said soot particles in said catalytic filter, wherein said active control of said first supply of said first additive is based on an amount of soot in said catalytic filter.

6. A method according to claim 1, wherein said active control of said first supply of said first additive is carried out in such a manner, that said active control causes a decrease in a first reduction of said first amount of nitrogen oxides $NO_{x\_1}$ in said catalytic filter, if said determined value $(NO_{2\_1}/NO_{x\_1})_{det}$ for said ratio is greater than or equal to an upper threshold value $(NO_{2\_1}/NO_{x\_1})_{threshold\_high}$, $(NO_{2\_1}/NO_{x\_1})_{det} \geq (NO_{2\_1}/NO_{x\_1})_{threshold\_high}$.

7. A method according to claim 6, wherein said decrease in a first reduction of said first amount of nitrogen oxides $NO_{x\_1}$ is achieved by said active control decreasing said first supply of said first additive.

8. A method according to claim 6, wherein said upper threshold value $(NO_{2\_1}/NO_{x\_1})_{threshold\_high}$ has a value representing one from among the group of:
    45%;
    50%;
    60%; and
    >65%.

9. A method according to claim 6, wherein said upper threshold value $(NO_{2\_1}/NO_{x\_1})_{threshold\_high}$ has a value that depends on a representation of a temperature of said catalytic filter and/or of the reduction catalyst device, arranged downstream of said catalytic filter.

10. A method according to claim 1, wherein said at least partly catalytic coating comprised in said catalytic filter also has oxidizing characteristics.

11. A method according to claim 1, further comprising:
    a second oxidation of compounds comprising one or more of nitrogen, carbon and hydrogen in said exhaust stream, wherein said second oxidation is carried out by a second oxidation catalyst, arranged downstream of said catalytic filter.

12. A method according to claim 11, wherein said active control of said first supply is also based on a determined value $(NO_{2\_2}/NO_{x\_2})_{det}$ for a second ratio, between a second amount of nitrogen dioxide $NO_{2\_2}$ and a second amount of nitrogen oxides $NO_{x\_2}$, reaching said reduction catalyst device.

13. A method according to claim 10, wherein said active control of said first supply of said first additive results in an active control of said first reduction of said first amount of nitrogen oxides $NO_{x\_1}$, which is carried out in said catalytic filter.

14. A method according to claim 10, wherein said first reduction of said first amount of nitrogen oxides $NO_{x\_1}$ is achieved by said first additive reacting with said first amount of nitrogen oxides $NO_{x\_1}$ in said catalytic filter.

15. A method according to claim 10, wherein said first reduction of said first amount of nitrogen oxides $NO_{x\_1}$ is achieved by a first amount of nitrogen dioxide $NO_{2\_1}$, comprised in said first amount of nitrogen oxides $NO_{x\_1}$, reacting with said soot particles at said oxidation of said soot particles in said catalytic filter, wherein said active control of said first supply of said first additive is based on an amount of soot in said catalytic filter.

16. A method according to claim 10, wherein said active control of said first supply is carried out in such a manner, that said active control of said first additive causes a decrease in a first reduction of said first amount of nitrogen oxides $NO_{x\_1}$ in said catalytic filter, if said determined value $(NO_{2\_1}/NO_{x\_1})_{det}$ for said ratio is greater than or equal to an upper threshold value $(NO_{2\_1}/NO_{x\_1})_{threshold\_high}$, $(NO_{2\_1}/NO_{x\_1})_{det} \geq (NO_{2\_1}/NO_{x\_1})_{threshold\_high}$.

17. A method according to claim 16, wherein said decrease in a first reduction of said first amount of nitrogen oxides $NO_{x\_1}$ is achieved by said active control decreasing said first supply of said first additive.

18. A method according to claim 16, wherein said upper threshold value $(NO_{2\_1}/NO_{x\_1})_{threshold\_high}$ has a value representing one from among the group of:
    45%;
    50%;
    60%; and
    >65%.

19. A method according to claim 16, wherein said upper threshold value $(NO_{2\_1}/NO_{x\_1})_{threshold\_high}$ has a value that depends on a representation of a temperature of said catalytic filter and/or of a reduction catalyst device, arranged downstream of said catalytic filter.

20. A method according to claim 1, wherein said active control of said first supply of said first additive is carried out in such a manner so as to cause an increase in a first reduction of said first amount of nitrogen oxides $NO_{x\_1}$ in said catalytic filter, if said determined value $(NO_{2\_1}/NO_{x\_1})_{det}$ for said ratio is smaller than or equal to a lower threshold value $(NO_{2\_1}/NO_{x\_1})_{threshold\_low}$, $(NO_{2\_1}/NO_{x\_1})_{det} \leq (NO_{2\_1}/NO_{x\_1})_{threshold\_low}$.

21. A method according to claim 20, wherein said increase in a first reduction of said first amount of nitrogen oxides $NO_{x\_1}$ is achieved because said active control increases said first supply of said first additive.

22. A method according to claim 20, wherein said lower threshold value $(NO_{2\_1}/NO_{x\_1})_{threshold\_low}$ has a value representing one from among the group:
    50%;
    45%;
    30%;
    20%; and
    10%.

23. A method according to claim 20, wherein said lower threshold value $(NO_{2\_1}/NO_{x\_1})_{threshold\_low}$ has a value that depends on a representation of a temperature of said catalytic filter and/or of a reduction catalyst device, arranged downstream of said catalytic filter.

24. A method according to claim 2, wherein said active control of said first supply of the first additive is based on said determined value $(NO_{2\_2}/NO_{x\_2})_{det}$ for the second ratio, so that a high determined value $(NO_{2\_2}/NO_{x\_2})_{det}$ for the second ratio results in supply of less first additive, than what a low determined value $(NO_{2\_2}/NO_{x\_2})_{det}$ results in.

25. A method according to claim 1, wherein:
    said active control of said first supply is based on a determined value $(NO_{2\_2}/NO_{x\_2})_{det}$ for a second ratio, between a second amount of nitrogen dioxide $NO_{2\_2}$ and a second amount of nitrogen oxides $NO_{x\_2}$ reaching said reduction catalyst device, arranged downstream of said catalytic filter; and
    said active control of said first supply of said first additive is carried out in such a manner, that an increased first reduction of said first amount of nitrogen oxides $NO_{x\_1}$ is carried out in said catalytic filter, if said determined value $(NO_{2\_2}/NO_{x\_2})_{det}$ for said ratio is smaller than or equal to a lower threshold value $(NO_{2\_2}/NO_{x\_2})_{threshold\_low}$; $(NO_{2\_2}/NO_{x\_2})_{det} \leq (NO_{2\_2}/NO_{x\_2})_{threshold\_low}$.

26. A method according to claim 25, wherein said increased first reduction of said first amount of nitrogen oxides $NO_{x\_1}$ is achieved because said active control causes said first supply of said first additive to increase.

27. A method according to claim 25, wherein said lower threshold value $(NO_{2\_2}/NO_{x\_2})_{threshold\_low}$ has a value representing one from among the group:
    50%;
    45%;
    30%;
    20%; and
    10%.

28. A method according to claim 26, wherein said lower threshold value $(NO_{2\_2}/NO_{x\_2})_{threshold\_low}$ has a value that depends on a representation of a temperature of said catalytic filter and/or of said reduction catalyst device.

29. A method according to claim 1, wherein:
    said active control of said first supply is based on a determined value $(NO_{2\_2}/NO_{x\_2})_{det}$ for a second ratio, between a second amount of nitrogen dioxide $NO_{2\_2}$ and a second amount of nitrogen oxides $NO_{x\_2}$ reaching said reduction catalyst device, arranged downstream of said catalytic filter; and
    said active control of said first supply of said first additive is carried out in such a manner, that a decreased first reduction of said first amount of nitrogen oxides $NO_{x\_1}$ is carried out in said catalytic filter, if said determined value $(NO_{2\_2}/NO_{x\_2})_{det}$ for said ratio is greater than or equal to an upper threshold value $(NO_{2\_2}/NO_{x\_2})_{threshold\_high}$; $(NO_{2\_2}/NO_{x\_2})_{det} \geq (NO_{2\_2}/NO_{x\_2})_{threshold\_high}$.

30. A method according to claim 29, wherein said decreased first reduction of said first amount of nitrogen oxides $NO_{x\_1}$ is achieved by said active control causing said first supply of said first additive to decrease.

31. A method according to claim 29, wherein said upper threshold value $(NO_{2\_2}/NO_{x\_2})_{threshold\_high}$ has a value representing one from among the group of:
    45%;
    50%;
    60%; and
    →65%.

32. A method according to claim 29, wherein said upper threshold value $(NO_{2\_2}/NO_{x\_2})_{threshold\_high}$ has a value that depends on a representation of a temperature of said catalytic filter and/or of said reduction catalyst device.

33. A method according to claim 1, wherein said active control of said first supply is also based on a coverage degree for additive for said catalytic filter and/or for a reduction catalyst device, arranged downstream of said catalytic filter.

34. A method according to claim 1, wherein said active control of said first supply is also based on at least one catalytic characteristic for said catalytic filter and/or for a reduction catalyst device, arranged downstream of said catalytic filter.

35. A method according to claim 1, wherein said active control of said first supply is also based on a representation of a temperature of said catalytic filter and/or of reduction catalyst device, arranged downstream of said catalytic filter.

36. A method according to claim 1, wherein said determined value $(NO_{2\_1}/NO_{x\_1})_{det}$ for said ratio consists of one from among the group:
   a predicted value;
   a modelled value; and
   a measured value.

37. A computer program product comprising computer program code stored on a non-transitory computer-readable medium, said computer program product for treatment of an exhaust stream resulting from a combustion in a combustion engine and comprising nitrogen oxides $NO_x$, wherein said nitrogen oxides $NO_x$ comprise nitrogen monoxide NO and nitrogen dioxide $NO_2$, said computer program product comprising computer instructions to cause one or more computer processors to perform the following operations:
   a first oxidation of compounds comprising one or more of nitrogen, carbon and hydrogen in said exhaust stream, wherein said first oxidation is carried out by a first oxidation catalyst arranged in said exhaust treatment system;
   a determination of a value $(NO_{2\_1}/NO_{x\_1})_{det}$ for a ratio between a first amount of nitrogen dioxide $NO_{2\_1}$ and a first amount of nitrogen oxides $NO_{x\_1}$, leaving said first oxidation catalyst;
   a first supply of a first additive into said exhaust stream with the use of a first dosage device, arranged downstream of said first oxidation catalyst and upstream of a catalytic filter;
   a first reduction of at least said first amount of nitrogen oxides NO, via a catalytic reaction in the catalytic filter, arranged downstream of said first dosage device, wherein said catalytic filter consists of a particulate filter with an at least partly catalytic coating with reduction characteristics, which is arranged for catching and oxidizing of soot particles, and to carry out said first reduction of said first amount of nitrogen oxides $NO_{x\_1}$, and wherein a catalytic reaction for said first reduction uses said first additive, and wherein said first supply is actively controlled based on said determined value $(NO_{2\_1}/NO_{x\_1})_{det}$ to thereby control the amount of nitrogen dioxide $NO_2$ provided to the input of the catalytic filter to thereby ensure both oxidation of soot particles and reduction of nitrogen oxides $NO_x$ in the catalytic filter;
   a second supply of a second additive into said exhaust stream with the use of a second dosage device, arranged downstream of said catalytic filter; and
   a second reduction of a second amount of nitrogen oxides $NO_{x\_2}$ reaching a reduction catalyst device, arranged downstream of said second dosage device, wherein said second reduction uses said first and/or second additive.

38. An exhaust treatment system arranged for treatment of an exhaust stream resulting from a combustion in a combustion engine and comprising nitrogen oxides $NO_x$, wherein said nitrogen oxides $NO_x$ comprise nitrogen monoxide NO and nitrogen dioxide $NO_2$, wherein said system comprises:
   a first oxidation catalyst arranged in said exhaust treatment system in order to oxidize compounds comprising one or more of nitrogen, carbon, and hydrogen in said exhaust stream;
   a control device arranged to provide:
      a determination of a value $(NO_{2\_1}/NO_{x\_1})_{det}$ for a ratio between a first amount of nitrogen dioxide $NO_{2\_1}$ and a first amount of nitrogen oxides $NO_{x\_1}$ leaving said first oxidation catalyst; and
      an active control of a first dosage device, arranged downstream of said first oxidation catalyst in order to carry out a first supply of a first additive into said exhaust stream, based on said determined value $(NO_{2\_1}/NO_{x\_1})_{det}$ for said ratio;
   a catalytic filter, arranged downstream of said first dosage device, wherein said catalytic filter consists of a particulate filter with an at least partly catalytic coating with reduction characteristics, which is arranged for catching and oxidizing of soot particles, and to carry out a first reduction of said first amount of nitrogen oxides $NO_{x\_1}$, and wherein a catalytic reaction for said first reduction uses said first additive, and wherein said first supply is actively controlled based on said determined value $(NO_{2\_1}/NO_{x\_1})_{det}$ to thereby control the amount of nitrogen dioxide $NO_2$ provided to the input of the catalytic filter to thereby ensure both oxidation of soot particles and reduction of nitrogen oxides $NO_x$ in the catalytic filter;
   a second dosage device, arranged downstream of said catalytic filter, in order to carry out a second supply of a second additive into said exhaust stream; and
   a reduction catalyst device, arranged downstream of said second dosage device, in order to carry out a second reduction of a second amount of nitrogen oxides $NO_{x\_2}$ reaching said reduction catalyst device, wherein said second reduction uses said first and/or second additive.

39. An exhaust treatment system according to claim 38, wherein said at least partly catalytic coating comprised in said catalytic filter also has oxidizing characteristics.

40. An exhaust treatment system according to claim 38, also comprising:
   a second oxidation catalyst, arranged downstream of said catalytic filter, in order to carry out a second oxidation of compounds comprising one or more of nitrogen, carbon and hydrogen in said exhaust stream.

41. An exhaust treatment system according to claim 38, wherein said reduction catalyst device comprises one from among the group of:
   a selective catalytic reduction catalyst (SCR); and
   a selective catalytic reduction catalyst (SCR) followed downstream by a slip-catalyst (SC), wherein said slip-catalyst (SC) is arranged to oxidize a residue of additive and/or to assist said selective catalytic reduction catalyst (SCR) with an additional reduction of nitrogen oxides $NO_x$ in said exhaust stream.

* * * * *

UNITED STATES PATENT AND TRADEMARK OFFICE
CERTIFICATE OF CORRECTION

PATENT NO. : 10,920,632 B2
APPLICATION NO. : 15/750161
DATED : November 17, 2020
INVENTOR(S) : Magnus Nilsson et al.

It is certified that error appears in the above-identified patent and that said Letters Patent is hereby corrected as shown below:

In the Claims

In Column 26, Claim 28, Line 28 please replace "26" with "25"

Signed and Sealed this
Fifth Day of July, 2022

Katherine Kelly Vidal
Director of the United States Patent and Trademark Office